(12) United States Patent
Narayanan et al.

(10) Patent No.: US 10,521,078 B2
(45) Date of Patent: Dec. 31, 2019

(54) SYSTEMS AND METHODS FOR ACCELERATING USER INTERACTIONS ON TOUCHSCREEN DEVICES

(71) Applicant: DELL PRODUCTS L.P., Round Rock, TX (US)

(72) Inventors: Padmanabhan Narayanan, Chennai (IN); Thulasi Devi Ravinanthanan, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 365 days.

(21) Appl. No.: 15/083,182

(22) Filed: Mar. 28, 2016

(65) Prior Publication Data

US 2017/0277366 A1 Sep. 28, 2017

(51) Int. Cl.
G06F 3/0482 (2013.01)
G06F 3/0488 (2013.01)
H04L 12/24 (2006.01)
H04L 29/08 (2006.01)

(52) U.S. Cl.
CPC .......... *G06F 3/0482* (2013.01); *G06F 3/0488* (2013.01); *H04L 41/0266* (2013.01); *H04L 67/141* (2013.01)

(58) Field of Classification Search
None
See application file for complete search history.

(56) References Cited

U.S. PATENT DOCUMENTS

| 9,645,700 B2 * | 5/2017 | Tsai ....................... G06F 3/0481 |
| 2007/0033155 A1 * | 2/2007 | Landsman ........ G06F 17/30899 |
| 2009/0100323 A1 * | 4/2009 | Walls .................. G06F 17/3087 |
| | | 715/206 |
| 2012/0054351 A1 * | 3/2012 | Pasternak ............... G06F 9/541 |
| | | 709/227 |

(Continued)

OTHER PUBLICATIONS

Aprelium—"How do web servers work" <https://aprelium.com/data/doc/2/abyssws-linux-doc-html/howdowswork.html> (Year: 2005).*

*Primary Examiner* — Beau D Spratt
(74) *Attorney, Agent, or Firm* — North Weber & Baugh LLP

(57) ABSTRACT

Disclosed systems and methods provide an integrated hypermedia engine (IHE) that monitors and predicts user activity on spawned document windows and spliced network management CLI/GUI sessions. In embodiments, the IHE proactively assists a user to efficiently use device-related documentation in an intuitive manner that requires minimal user interaction and, thereby, reduces the likelihood of human error, e.g., when configuring network devices involves multi-tiered, dynamic configuration paths. The IHE may acts as bridge between document windows and spliced network management sessions, for example, to enable seamless transfer of a CLI command from a document window to an inline GUI panel launched by a CLI session when constructing a command line. In embodiments, a context-ware IHE may create and take advantage of documentation tags by interpreting relationships between commands to enable auto-navigation of the document. Certain embodiments provide for monitoring and mapping a CLI/GUI output back to the appropriate documentation.

20 Claims, 36 Drawing Sheets

(56) References Cited

U.S. PATENT DOCUMENTS

| | | | | |
|---|---|---|---|---|
| 2012/0166470 A1* | 6/2012 | Baumgaertel | ..... | G06F 17/30554 |
| | | | | 707/769 |
| 2012/0303758 A1* | 11/2012 | Anbarasan | .......... | H04L 41/0266 |
| | | | | 709/218 |
| 2014/0101290 A1* | 4/2014 | Johnston | ................. | H04L 67/16 |
| | | | | 709/219 |
| 2014/0280875 A1* | 9/2014 | Narayanan | .............. | H04L 41/12 |
| | | | | 709/224 |
| 2015/0237112 A1* | 8/2015 | Landsman | .............. | H04L 67/06 |
| | | | | 709/203 |
| 2015/0261875 A1* | 9/2015 | Pignataro | .......... | G06F 17/30896 |
| | | | | 715/234 |
| 2016/0119477 A1* | 4/2016 | Sharpe | .................... | H04W 4/21 |
| | | | | 379/265.09 |
| 2017/0123631 A1* | 5/2017 | Sharma | ................. | G06F 3/0482 |

\* cited by examiner

```
cli_commands_scratchpad.txt - Notepad
File  Edit  Format  View  Help interface TenGigabitethernet 1/15
no shutdown
port-channel-protocol lacp
port-channel 32 mode active interface TenGigabitethernet 1/16
no shutdown
port-channel-protocol lacp
port-channel 32 mode active interface TenGigabitethernet 1/17
no shutdown
port-channel-protocol lacp
port-channel 32 mode active interface TenGigabitethernet 1/18
no shutdown
port-channel-protocol lacp
port-channel 32 mode active                    ─1720

BOOT_USER # show bootvar

PRIMARY OPERATING SYSTEM BOOT PARAMETERS:
==========================================
boot device                    : ftp
file name                      : /home/lab/FTOS_CP_P1.bin
Management Ethernet IP address : 10.16.134.151
Mask                           : 255.255.0.0
Server IP address              : 10.16.129.188
Default Gateway IP address     : 10.16.218.254
username                       : lab
password                       : ***

SECONDARY OPERATING SYSTEM BOOT PARAMETERS:
==========================================
No Operating System boot parameters specified:

DEFAULT OPERATING SYSTEM BOOT PARAMETERS:
==========================================
boot device                    : tftp
file name                      : FTOS-VGCP-1-0-0-2068.bin
Management Ethernet IP address : 10.16.134.151
Mask                           : 255.255.0.0
Server IP address              : 10.16.127.35
Default Gateway IP address     : 10.16.218.254
```

FIG. 17

SYSTEMS AND METHODS FOR ACCELERATING USER INTERACTIONS ON TOUCHSCREEN DEVICES

BACKGROUND

A. Technical Field

The present invention relates to information handling systems and, more particularly, to systems, devices, and methods of improving user interactions on touchscreen devices.

B. Background of the Invention

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many existing information handling systems still require cumbersome manually data entry that involves a great number of keyboard strokes and mouse clicks, for example, to transfer data from one window to another when managing the configuration of various components of the information handling systems, such network devices (e.g., network switches). Accordingly, what is needed are solutions that provide for more efficient systems and methods to manage information handling systems.

BRIEF DESCRIPTION OF THE DRAWINGS

Reference will be made to embodiments of the invention, examples of which may be illustrated in the accompanying figures. These figures are intended to be illustrative and not limiting. Although the invention is generally described in the context of these embodiments, it should be understood that this is not intended to limit the scope of the invention to these particular embodiments. Elements in the figures may not be drawn to scale.

FIG. 3A shows an exemplary document opened in a document viewer window via a console menu, according to various embodiments of the present disclosure.

FIG. 13A illustrates a multi-parameter command awaiting user confirmation prior to issue, according to various embodiments of the present disclosure.

FIG. 15A illustrates context-awareness with respect to a document viewer window and a SNM session, according to various embodiments of the present disclosure.

FIG. 17 illustrates the use of a scratchpad as a document source, according to various embodiments of the present disclosure.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In the present disclosure the term "document" general refers to "documentation" and includes any number and type of document. "Touchscreen" and "touchscreen device" include handheld devices, tablets, touchscreen laptops, convertibles, and any other device in comprising a touchscreen. "Network" and "network device" include switches, routers, and any other network elements recognized by one of skilled in the art. The use of CLIs and GUIs is not intended as a limitation since the embodiments of the invention may be extended to all types of user interactions. The terms "document tag," "tag," and "command tag" refers mainly to visual indicators that highlight locations and/or text in a document displayed on a screen.

Figure 1:
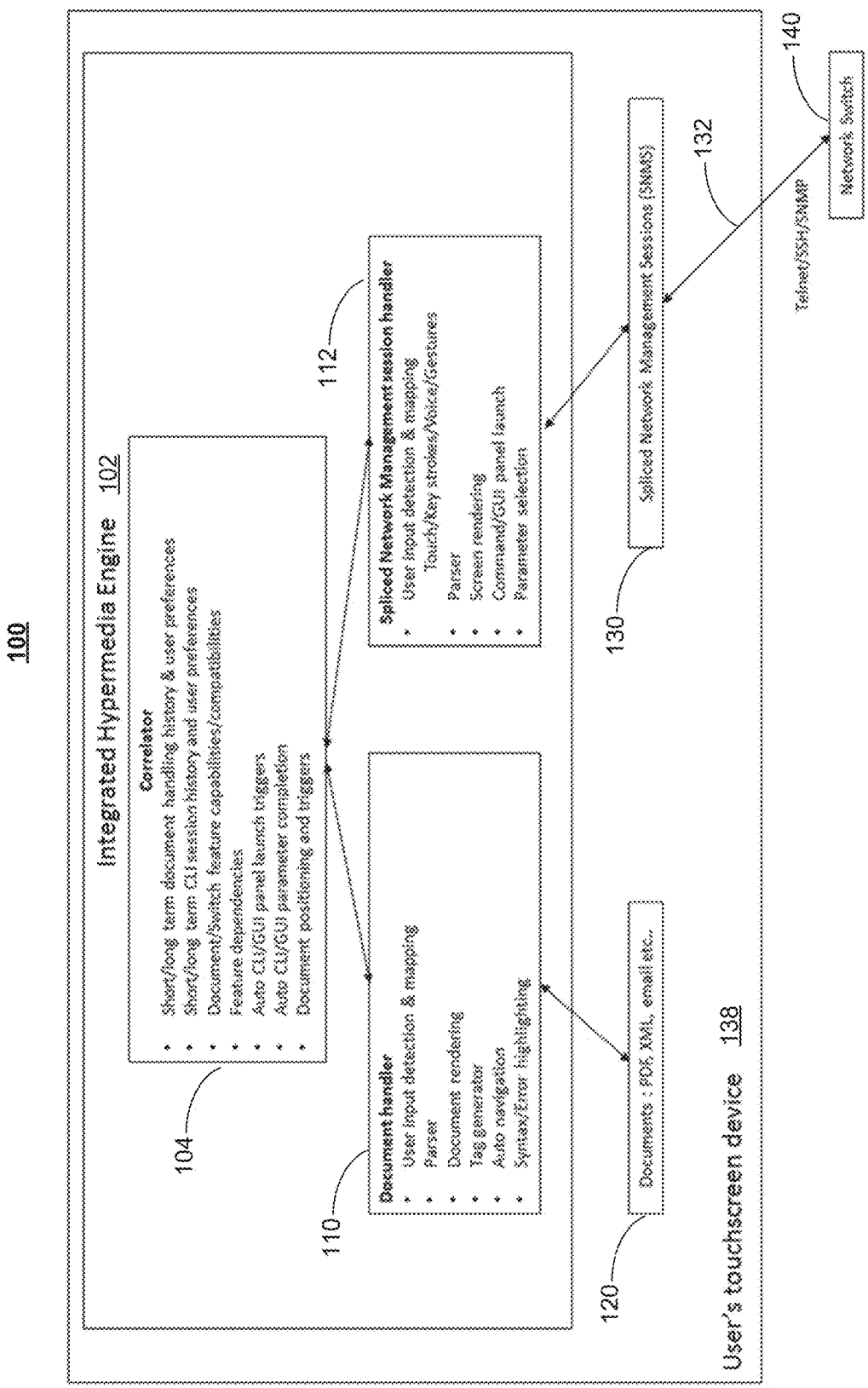
FIG. 1 is a general illustration of a system to accelerate user interactions on touchscreen devices, according to various embodiments of the present disclosure.

FIG. 1 illustrates an exemplary system to accelerate user interactions on touchscreen devices, according to various embodiments of the present disclosure. System 100 comprises IHE 102 and network device 140. Network device 140 is any configurable network device known in the art, such as a network switch. IHE 102 may communicate with document handler 110 and session handler 112 via correlator 104. In embodiments, IHE 102 has complete control over both document handler 110 and session handler 112.

Document handler 110 may be a built-in handler that supports viewing various types of documents, such as Command Line Interface (CLI) references, configuration guides, application notes, field notices, plain text documents, xml/html documents, pdf documents, emails, etc., via document viewer window 120 on touchscreen device 138.

Session handler 112 is designed to launch a SNM session, display it on touchscreen device 138 in spliced session window 130, and establish, e.g., via communication path 132, a connection to network device 140 based on the properties of network device 140 (hardware, software version, user privileges, etc.).

In operation, IHE 102 uses document handler 110 and session handler 112 and their spawned windows to monitor and predict user activity on touchscreen device 138 to pro-actively assist a user to navigate multi-tiered, dynamic configuration paths for network device 140, while seamlessly utilizing document sources with a greatly reduced number of user interactions. In embodiments, IHE 102 is automatically launched in response to a user starting a corresponding software, such as a CLI application. IHE 102 may, in turn, launch document handler 110 to open a document in document viewer window 120, e.g., as a child application of IHE 102. In embodiments, while the user has the ability to navigate the open document as in a standard document viewer, user interactions with the document are guided and tracked by IHE 102.

In embodiments, IHE 102 further launches session handler 112 that performs one or more functions, such as managing how the user interacts with touchscreen device 138; receiving user input via various means; performing screen reading rendering; launching GUI/CLI panels; selecting parameters such as numbers and interface names and managing the injection of commands into an SNM session via a buffer. For example, session handler 112 may receive from SNM session a command to be injected into a current session and launch spliced session window 130 that publishes the command on the touchscreen. In embodiments, SNM session window 130 is opened as a child session of IHE 102, based on user privileges.

In embodiments, session handler 112 creates the SNM session and establishes a connection to network device 140 via communication path 132 using any known communication protocol, such as SSH, telnet, COM, Rlogin. In embodiments, session handler 112 is built into a version of a client, e.g., SSH, telnet, COM, or Rlogin, such that session handler 112 need not launch external utilities or applications to start an SNM session (e.g., a CLI session).

SNM session may be spliced, i.e., when it opens SNM session window 130 presented to a user, window 130 is managed and rendered by IHE 102 that monitors the input and output to session handler 112 and instructs document handler 110, for example, how to navigate the document in document window 120. In embodiments, IHE 102 has the context of and correlates both document handler 110 and session handler 112, e.g., via correlator 104.

In embodiments, after an SNM session is launched, e.g., via telnet, and opens SNM session window 130, IHE 102 automatically queries the connected network device 140 (e.g., by using "show . . . ") command, to obtain and learn configuration information, such as the hardware version of network device 140, the OS version that is running, the current hardware or software configuration, and the like. Having obtained the type of hardware, IHE 102 may also infer which parser database it should use for that particular network device in the subsequent tag generation. In addition, due to the nature of the SNM session being a spliced session, and the parser database already containing some information, IHE 102 may also learn about features and pre-configured and to-be-configured commands. This learning may conveniently occur in the back-end without user involvement. It is noted that a user may open any number of documents for any number of devices to launch SNM sessions to study documents and apply commands to spliced session window 130.

In embodiments, the SNM session feeds commands received from network device 140 back to IHE 102 for interpretation. Once a command output by network device 140 is interpreted by IHE 102, that information is passed to the document handler. As an example, once the user configures a particular feature (e.g., CLI item #1) and the CLI executes the command, IHE 102 learns from the fed back command about the executed command, so that the IHE 102 may instruct the document handler to move to the next command in the document.

It is noted that while certain tasks herein are performed by session handler 112 and others by document handler 110, the separation is not intended as a limitation, as each handler may perform some or all tasks of the other.

In embodiments, IHE 102 opens a backend connection to network device 140 to facilitate input/output operations. While a user has the ability to operate SNM session window 130 like a standard CLI session client, in embodiments, user interactions with SNM session window 130 and commands transmitted to network device 140 are monitored by IHE 102. Similarly, the output of network device 140 may be monitored, parsed, learned, and rendered to SNM session window 130. In embodiments, session handler 112 comprises a built-in parser that supports various network devices 140, e.g., various types of switching products. Typically, once SNM session window 130 is opened, IHE 102 issues, via back-end CLI console 200 session, a command, such as "show tech," "show running-config," "show system," "show version," and "show inventory," to learn a configuration state of network device 140.

In addition to enabling the configuration of network devices by using IHE 102 that causes a document handler to auto-navigate a document from feature to feature for each configuration, i.e., by generating a flow from the document viewer to the SNM session, the presented framework may also aid in reverse-mapping the a SNM session output back to the appropriate documentation. This may help a user to properly interpret a document in document viewer window 120. For example, once a command is executed, and the SNM session generates an error message that indicates that a particular feature cannot be configured, based on the SNM session, IHE 102 may determine whether the opened document (e.g., a configuration guide) contains useful error interpretation information that may explain to the user the meaning of the error message. IHE 102 may then find and correlate the error to a location in the document that containing the useful information and instruct document handler 110 to auto-navigate to and display the appropriate document location. As a result, the user need not independently search documents to gain access to sought after information.

Figure 2:
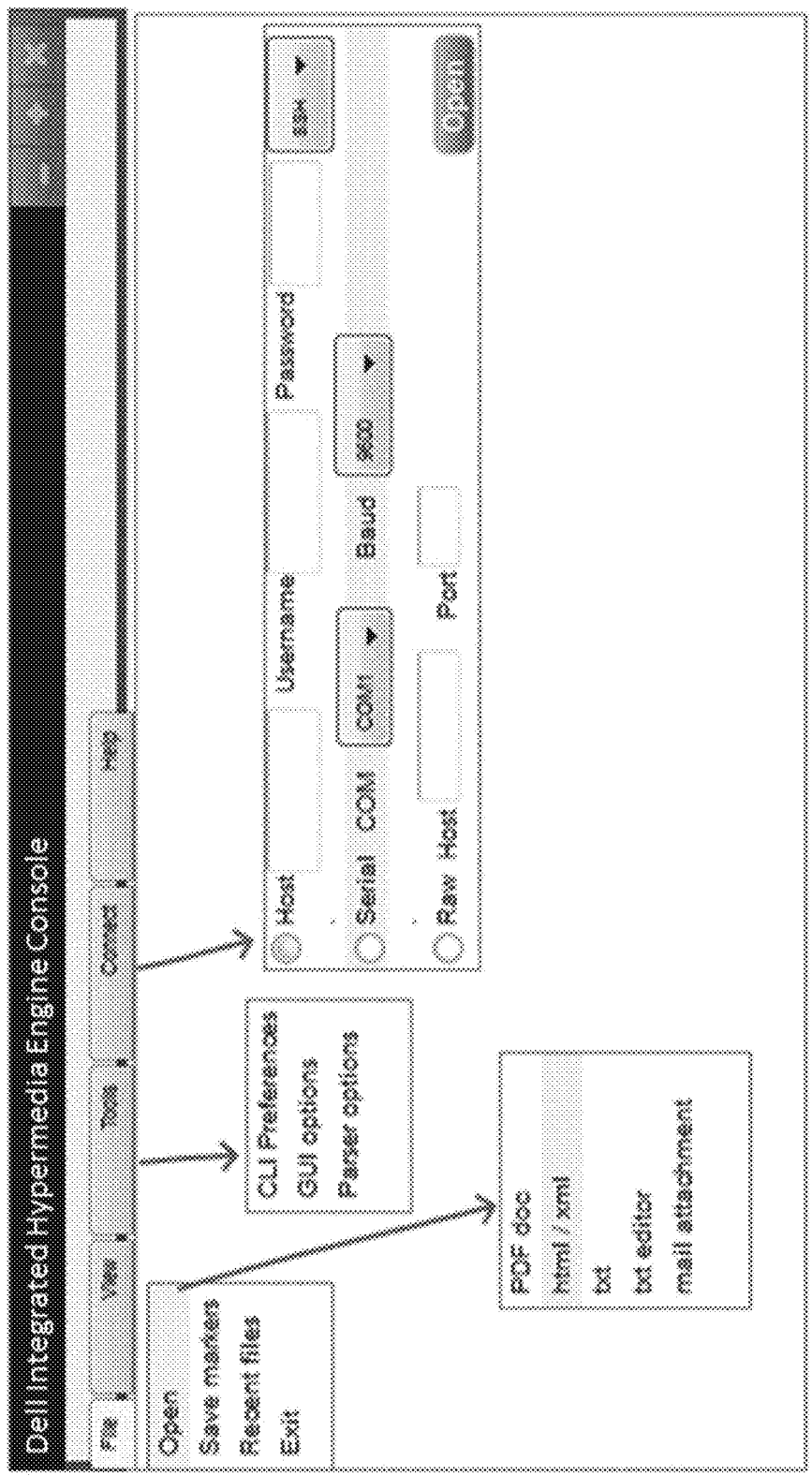
FIG. 2 illustrates an integrated hypermedia engine (IHE) console with exemplary menus, according to various embodiments of the present disclosure.

In embodiments, the integrated application that runs IHE 102 allows the user to interact with the touchscreen via one or more interfaces to enter and modify configuration settings (e.g., document parsing options for the document handler). The SNM session window, for example, may be either a CLI or a GUI. FIG. 2 illustrates an IHE console with exemplary menus, according to various embodiments of the present disclosure. Console 200 is displayed in a window format having various user menus. In embodiments, IHE console window 200 optionally displays activity captured by the IHE that relates to user activity. User activity comprises interactions between the user, open documents, and SNM sessions that capture a configuration state of the network device (e.g., transmitted commands). In embodiments, if entries via a voice interface are enabled as a means of user interaction, the integrated application may include settings that restrict voice commands to a subset of a class of CLI parameters. It is noted while various methods disclosed herein may benefit from control via voice recognition, embodiments of the present disclosure may be sustained independent of voice recognition.

Figure 3A:
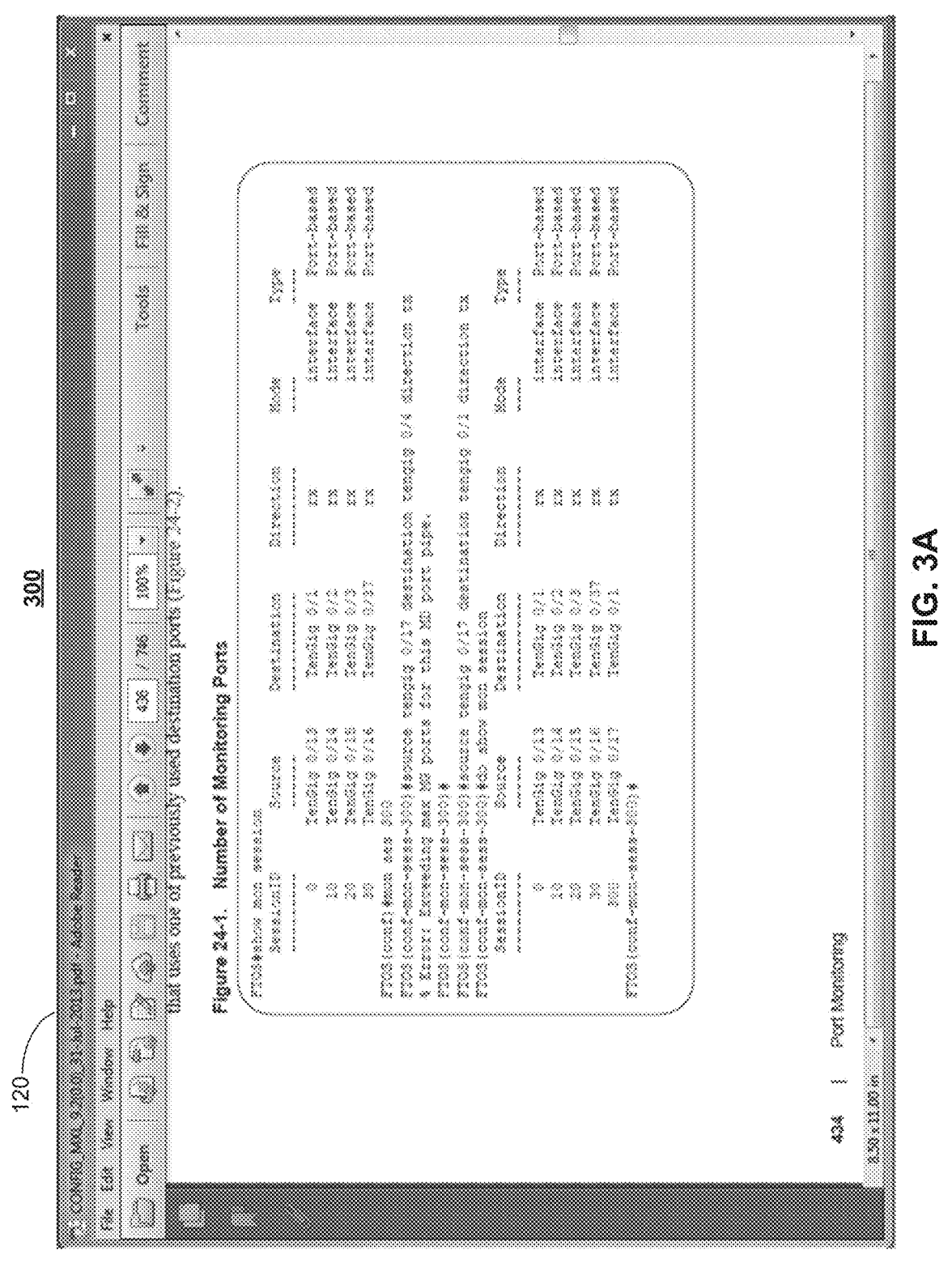
Figure 3B:
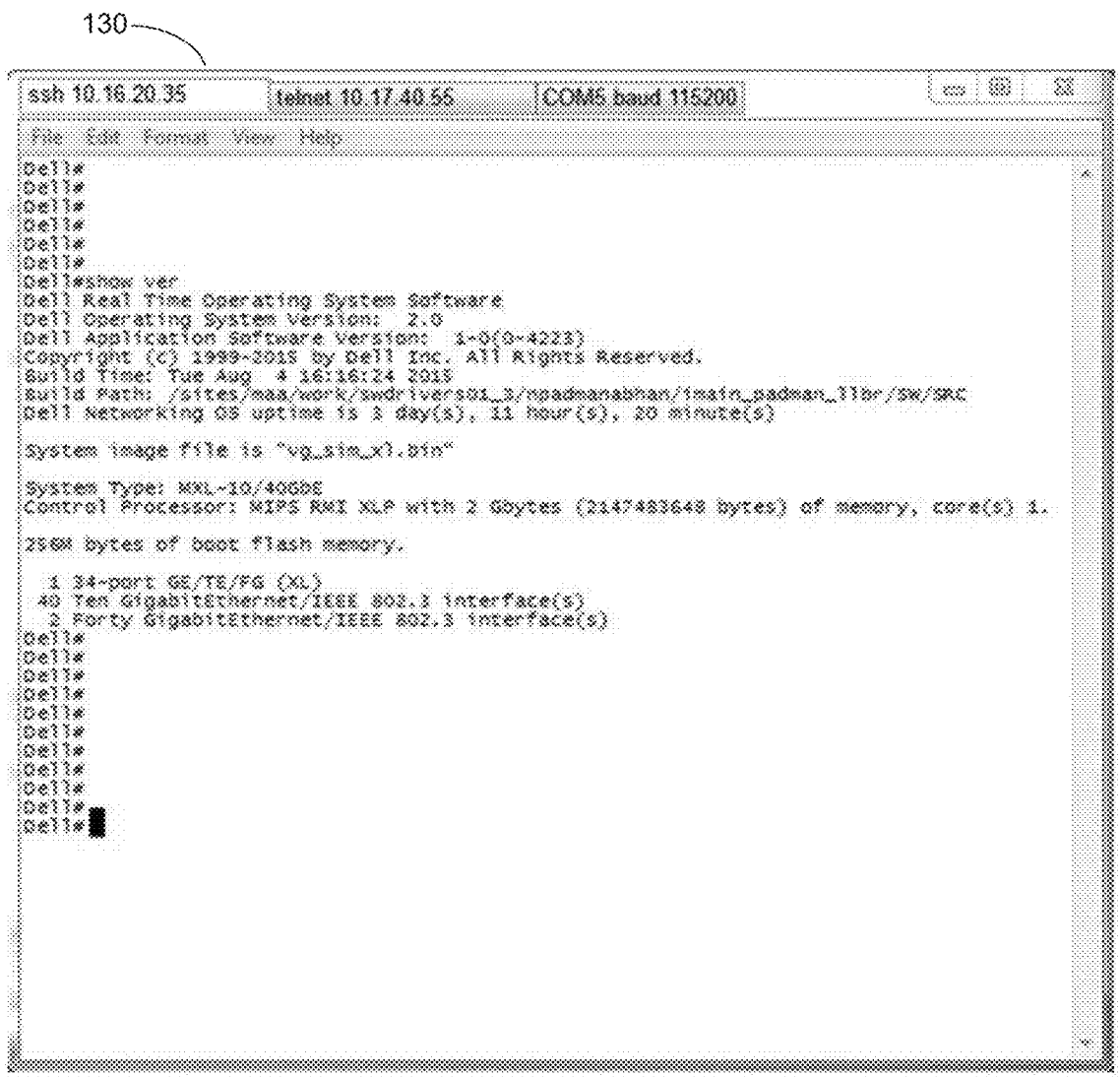
FIG. 3B illustrates a spliced spliced network management (SNM) session window opened via a console menu, according to various embodiments of the present disclosure.
Figure 3C:
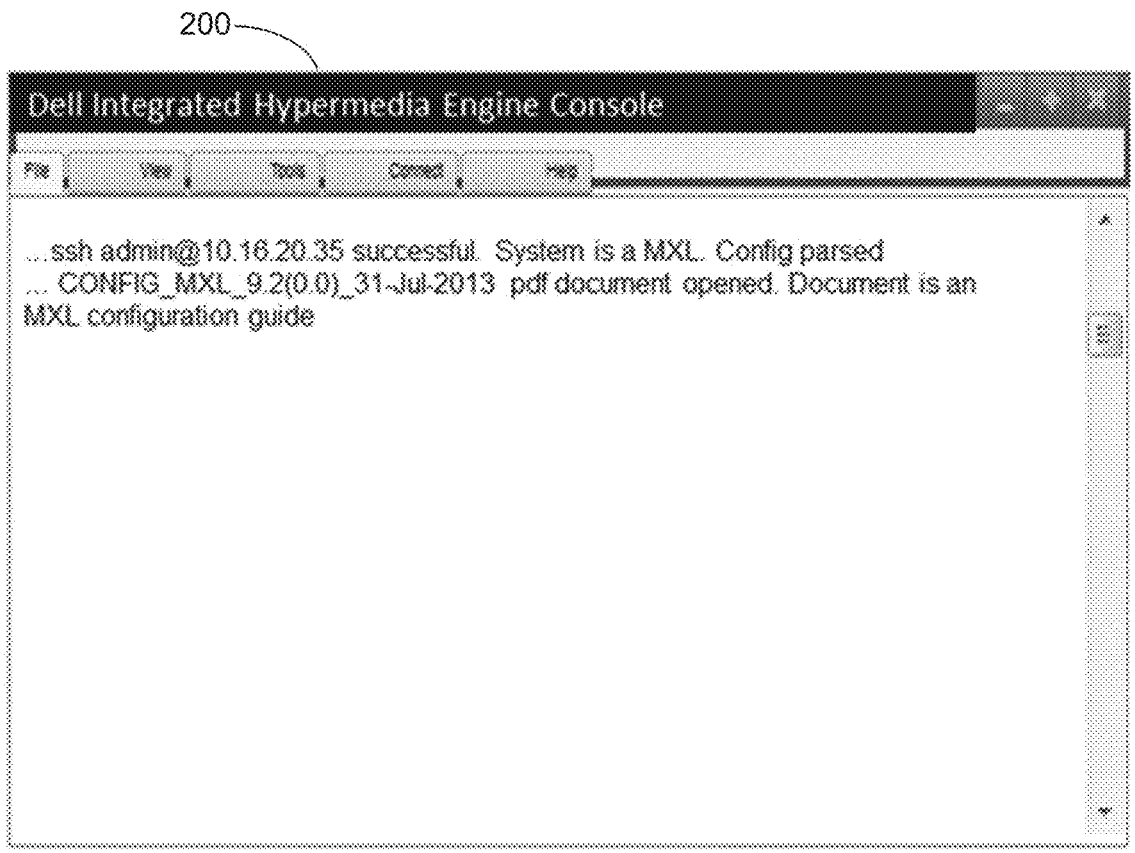
FIG. 3C illustrates how IHE activity is logged according to various embodiments of the present disclosure.

FIG. 3A shows an exemplary document that has been opened in document viewer window 120 via the console menu shown in FIG. 2. The document is a switch configuration guide entitled CONFIG_MXL_9.2(0.0)_31-Jul-2013.pdf. FIG. 3B illustrates a spliced SNM session window 130 that has been opened using the console menu shown in FIG. 2. The exemplary session is a CLI SSH session to IP address 10.16.20.35. Console window 200 in FIG. 3C displays IHE activity that is logged on the console. The log describes the type of document that is opened in document window. In embodiments, in response to a multi-touch operation performed by the user, who selects SNM session window 130 and document viewer window 120, IHE associates the SNM session (e.g., a CLI session) displayed in SNM session window 130 with the opened document displayed in document viewer window 120.

In embodiments, based on type or content of the document, IHE determines whether the opened document matches a particular network device, such as a network switch that is selected in the SNM session. If a match is found, IHE provides a visual indication of the association between the document and the SNM session. Otherwise, if a match is not found, IHE issues a warning or error message to indicate that the association has been rejected.

Figure 4A:
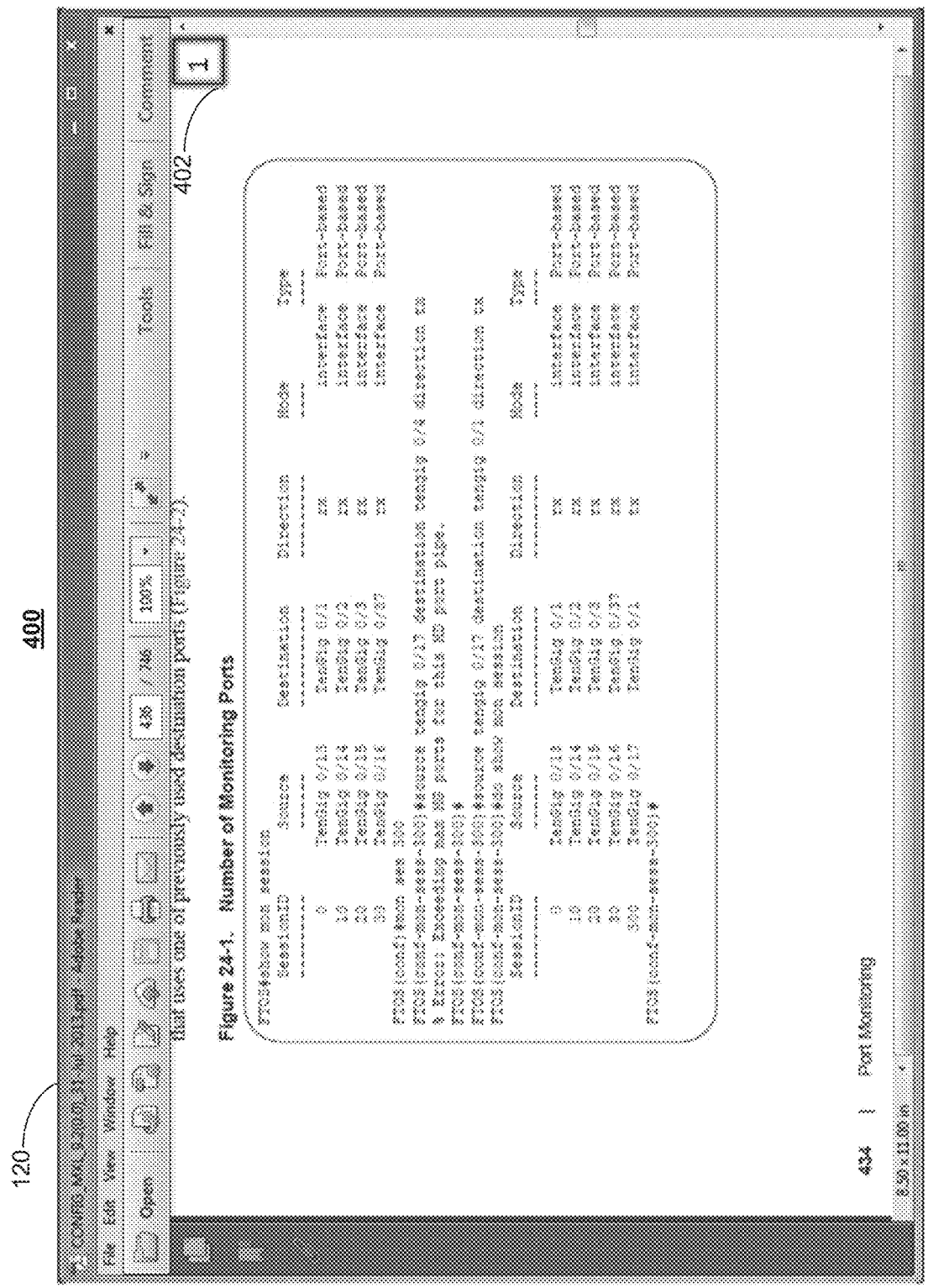
FIGS. 4A and 4B illustrate how a document viewer window and an SNM session window indicate an association between windows and/or their content, according to various embodiments of the present disclosure.
Figure 4B:
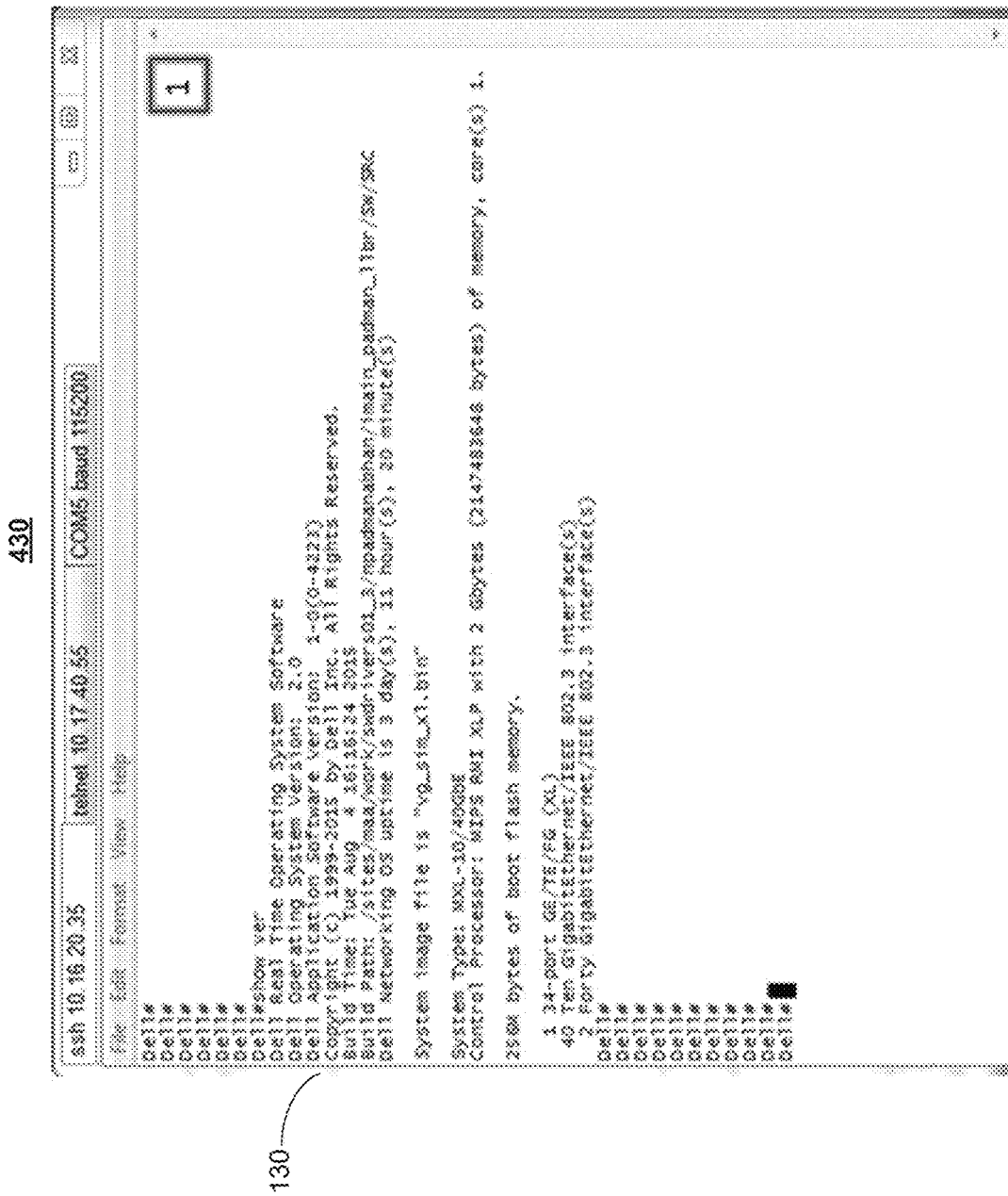
Figure 4C:
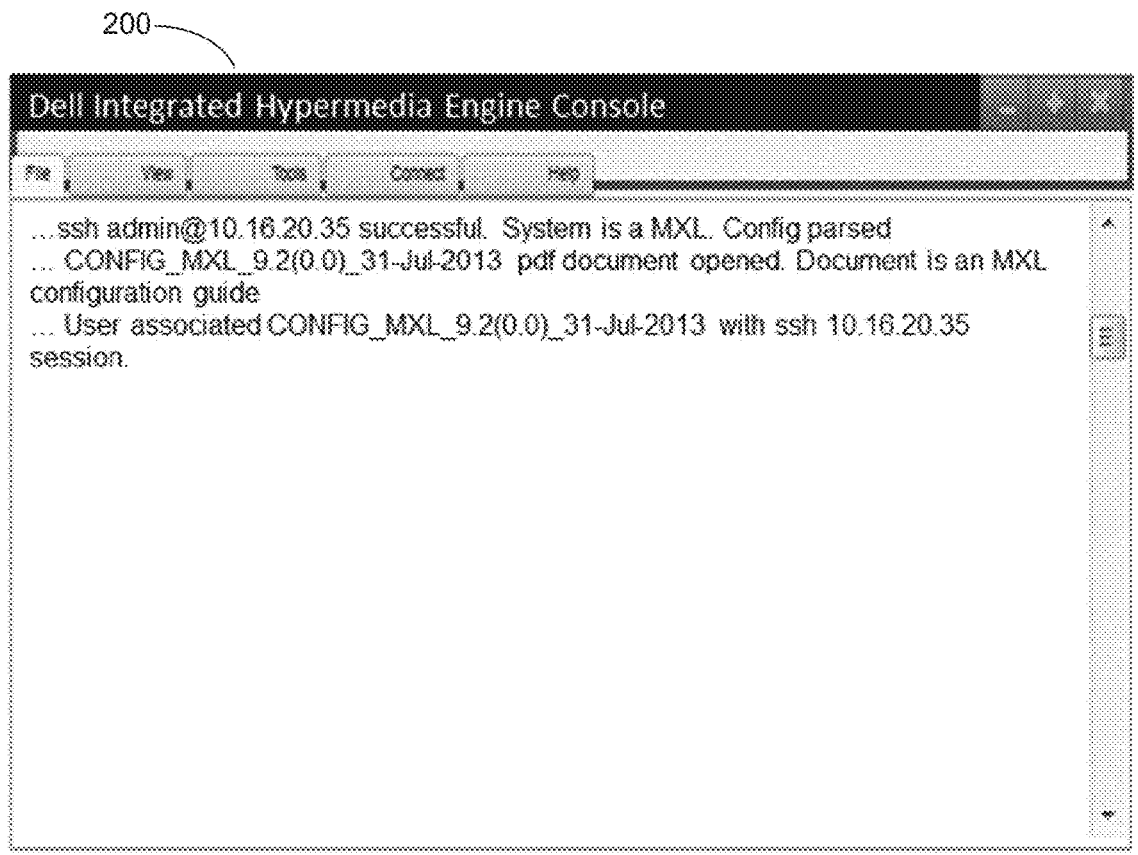
FIG. 4C illustrates how the console logs the association between document viewer and SNM session window and/or the association between their respective contents, according to various embodiments of the present disclosure.

Visual indication of the association between windows may be accomplished, for example, via visual markers. As depicted in example in FIGS. 4A and 4B, respectively, the top right sides of both document viewer window 120 and SNM session window 130 display the numeral 1 within a square text box 402 to indicate the association between the windows and, thus, an association between their content, according to various embodiments of the present disclosure. One skilled in the art will appreciate that other means of depicting an association between items on a screen are possible. For example, the menu bar of SNM session window 130 may display the title of the document (here "CONFIG_MXL_9.2(0.0)_31-Jul-2013.pdf"), and the menu bar of document viewer window 120 may display details of the CLI session (here "ssh admin@10.16.20.35"). As shown in FIG. 4C, console 200 logs the association between document viewer 120 and SNM session window 130 and/or the association between their respective contents by displaying both the title of the document and the corresponding CLI session number.

In embodiments, once the IHE associates document viewer window 120 with the SNM session for which the IHE opens a backend connection to the network device, i.e., the IHE maps the document to the network device, the IHE may provide to the document handler a list of one or more commands for that particular network device. In embodiments, after the IHE validates that a particular document can be mapped to particular network device, the IHE identifies from a database of commands a list of SNM commands that is appropriate for the opened SNM session. Upon receipt of the list, the document handler launches document viewer window 120 and uses the list to parse the document to identify commands therein (e.g., CLI commands) and generate document tags adjacent to identified commands in document viewer window 120.

Figure 5A:
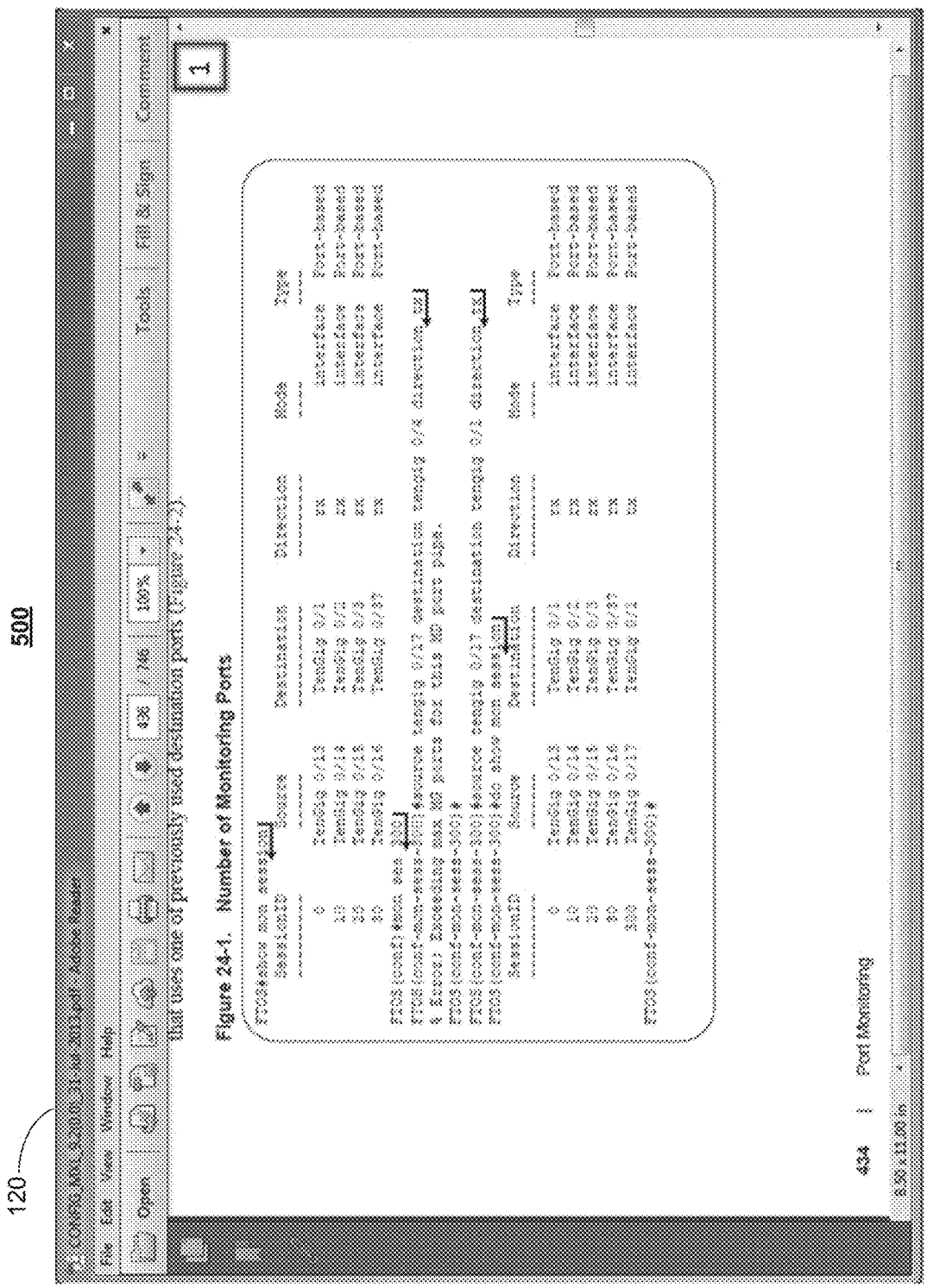
FIG. 5A illustrates tagging of exemplary commands in a document window, according to various embodiments of the present disclosure.
Figure 5B:
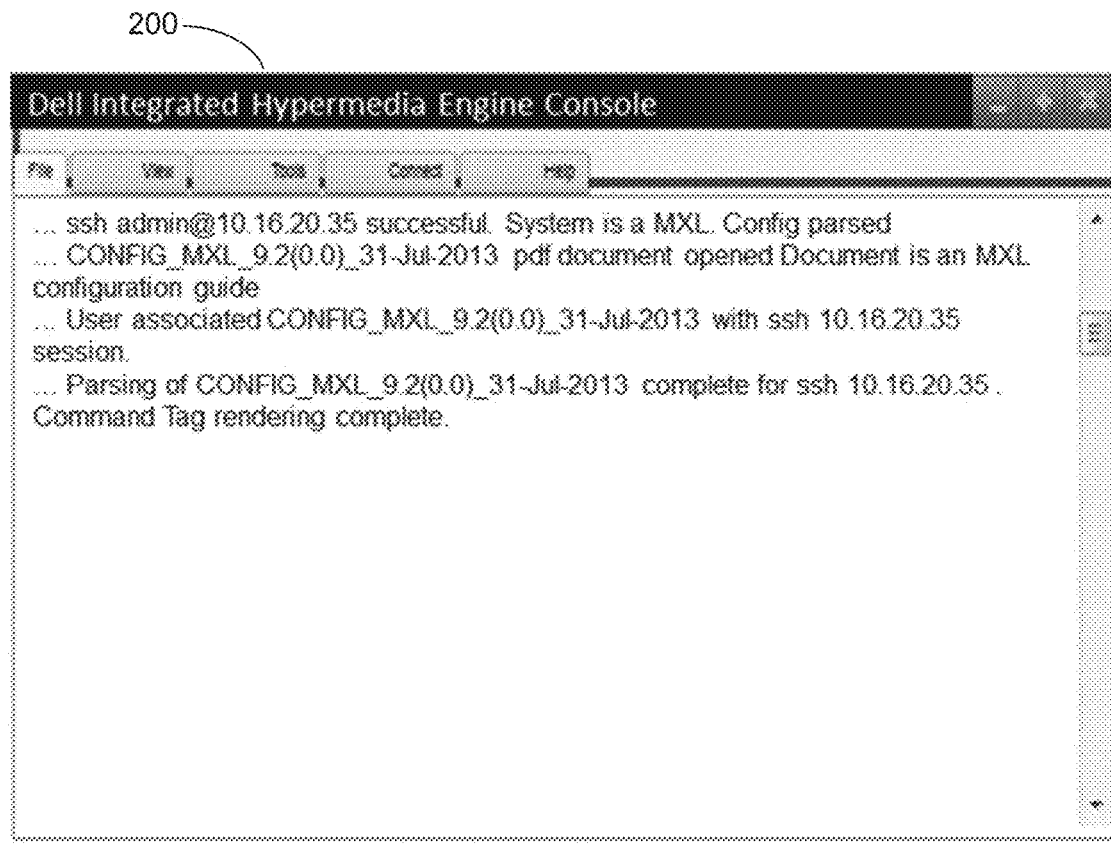
FIG. 5B illustrates how the console notifies a user that parsing of the document and command tag rendering are completed, according to various embodiments of the present disclosure.

As illustrated in FIG. 5A, selected commands (e.g., relevant CLI commands) may be tagged in document viewer window 120 by placing an "Enter" key icon adjacent to each selected command, according to various embodiments of the present disclosure. Once the document is parsed and tagged, console window 200 may notify the user that parsing of the document and command tag rendering are completed, as shown in FIG. 5B. In practice, a user with access to two or more devices of the same type, e.g., one that has read-only user privileges and a second device with executive user privileges would receive more tags for the latter device, including tags for commands that would be blocked on the former device to prevent unauthorized execution. A person of skill in the art will understand that tag colors, icon styles, sounds, etc., may be made user-selectable and, based on user preferences, parser options may use different tag schemes to allow the user to distinguish various types of commands displayed in document viewer window 120.

Command types may include pre-configured commands that already exist in the configuration of the network device, commands that already exist in the document but cannot be executed in the network device (e.g., due to software version mismatches or feature dependencies), and commands that are blocked (e.g., due to lack of appropriate user privileges). Configuring a feature may involve one or more of the following: 1) multiple steps to configure a feature; 2) dependencies on other features and, therefore, links to other feature configuration sections; and 3) links to sections in other documents.

In embodiments, a parser built into the document handler of the IHE identifies and classifies commands (e.g., CLI commands) in the document and groups a sequence of commands into sub-groups having a particular feature configuration. If feature configuration requires several steps that span numerous pages in the document, the user starts with step 1, and after execution of each subsequent step, the parser causes document viewer window 120 to auto-navigate and scroll to the next location without user intervention. In embodiments, the user may optionally lock the document to prevent auto-navigation.

In embodiments, dependencies between features within the document, i.e., between different locations within the document, are maintained when auto-navigating or scrolling across sections, pages, numbers, paragraphs, etc., the document. In embodiments, maintaining dependencies involves using features of a dependency tree, as will be discussed further below with respect to FIG. 19. In embodiments, auto-navigation is made possible because the IHE monitors the state of the SNM session and determines whether a particular command has been successfully processed, and further because the IHE is aware of steps that have not yet been configured. As an example, if the user is trying to configure feature B, and if feature B comprises a sequence of commands B1, B2, B3 & B4, and if B2 is dependent on A1 and A2 (of feature A), if the user has not yet configured A1 & A2, upon completion of B1, the document viewer notifies the user so and auto-scrolls to A1. After completing A2, the IHE may use the document viewer to auto-scroll back to the location of step B2 to resume with processing of step B2.

In embodiments, the user injects a command from document viewer window 120 into a corresponding SNM session (e.g., into an associated CLI session's current command line) by selecting the command, e.g., by touching the tag adjacent to that command in document viewer window 120.

It is noted that most existing methods open (e.g., via an SSL or telnet connection) a CLI session and a pdf document. Then the user manually enters data, i.e., via copy and paste from the document into the CLI session. In contrast, the methods disclosed herein capture in a document viewer a command, selected or identified via corresponding tags, and pass the command to an IHE that infers the user's intent to issue the selected command, as the IHE already knows that the document viewer and the document comprising the tagged command are associated with that particular CLI session. As a result, the IHE sends the command to the SNM handler associated with a session, so that the SNM handler can issue (or execute) the command, i.e., send the completed command to the back-end device after verifying that that it may be issued. In embodiments, the SNM session handler receives a response form the back-end obtained in the SNM session and displays it on back-end CLI console session window 200.

In embodiments, the command that the user injects is targeted at the network device that has been mapped to the document in document viewer window 120. Based on the context, the command may be issued right away, or remain in a CLI session buffer for further processing based on the session handler. In embodiments, once the SNM handler knows that the command has no multiple parameters, the user may inject the command directly, i.e., the SNM handler directly injects the command into the back-end session. Conversely, parameterized commands are sent to the back-end session via the spliced session. In embodiments, when user attempts to inject multi-parameter commands from document viewer window 120 into the CLI session, the session handler intercepts the command in the command buffer and presents possible options within SNM session window 130, for example, "inline" by using a GUI panel.

Figure 6A:
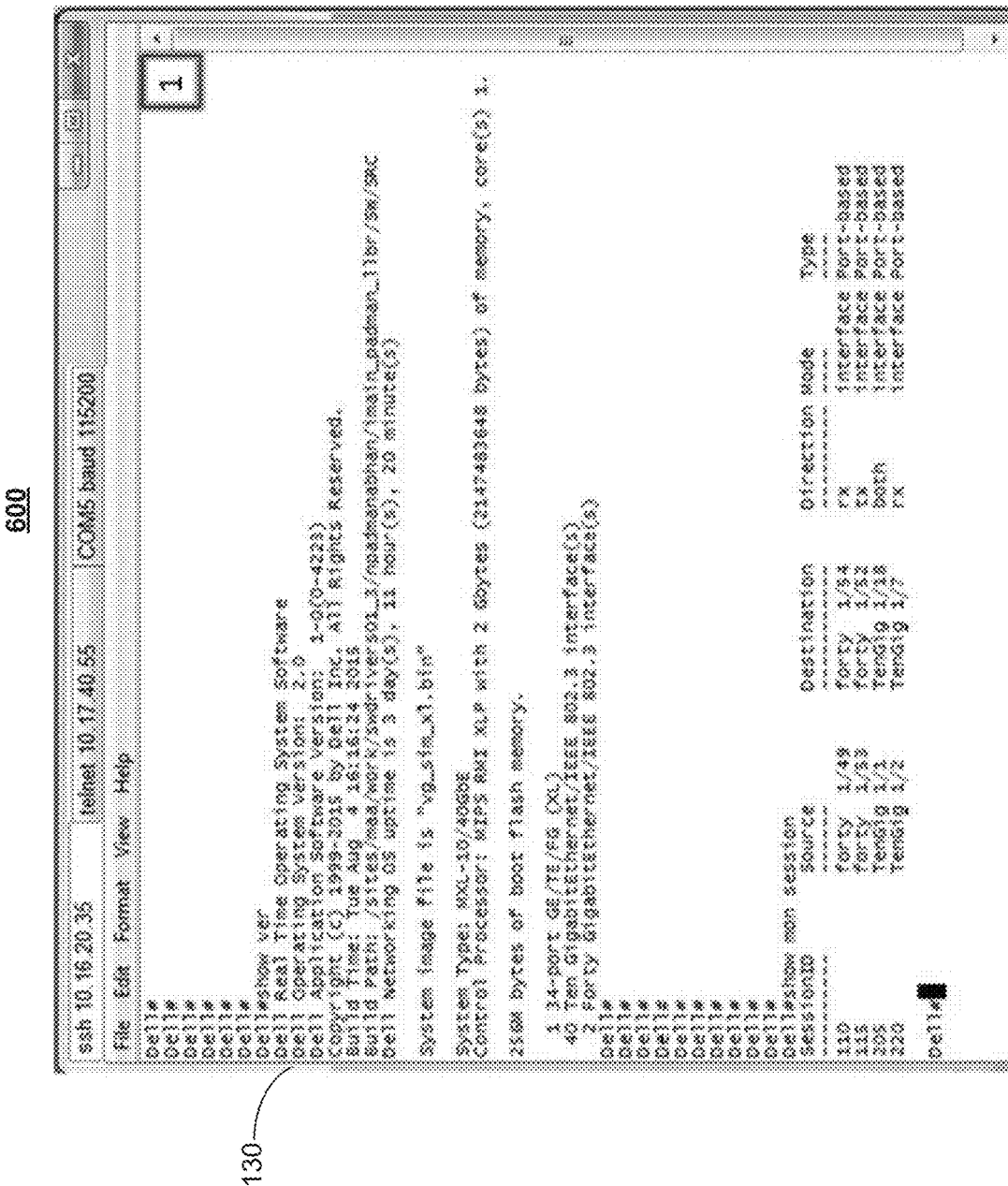
FIG. 6A illustrates command injection and execution into an SNM session, according to various embodiments of the present disclosure.
Figure 6B:
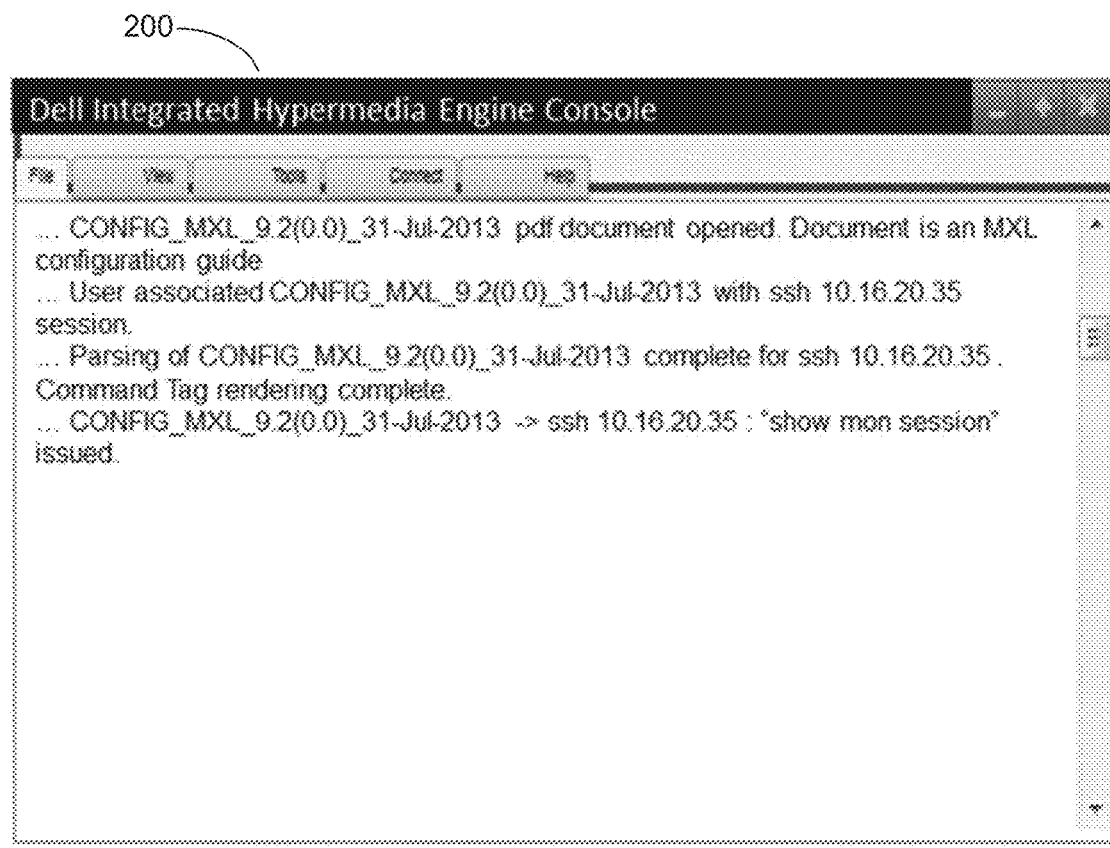
FIG. 6B illustrates how the console indicates command injection and execution, according to various embodiments of the present disclosure.

FIG. 6A illustrates command injection and execution into an SNM session, according to various embodiments of the present disclosure. Once the user selects the command "show mon session" by touching the "Enter" key icon tag adjacent to that command in document viewer window 120, the command is injected and executed in the CLI session in SNM session window 130 as shown in FIG. 6B, and console 200 indicates that the command execution is logged. In embodiments, based on user preferences, the IHE, prior to injecting the selected command into the CLI session, performs one or more transformations on the command, such as expanding the command's full form (as in auto-complete) or using user specific aliases.

It is noted that although SNM session window 130 may be opened as a typical command line interface, the screen is controlled and rendered by the IHE that monitors user inputs before they are displayed on that window. One of skill in the art will appreciate that if multiple devices are associated with a document displayed by a single document viewer, it may be necessary to re-associate from one device to another prior to injecting the command.

In embodiments, once the command "mon session 300" is selected by the user to create a monitoring session, the command may be injected into the SNM session. The command is a single parameter command that may be used to monitor or sniff data packets entering or exiting a particular interface, e.g., to monitor multiple source ports and packets sent to a destination interface. Multiple sessions may be monitored. The user may have already created five independent monitoring session IDs, e.g., 0, 10, 20, 30, and 300. The monitoring session number is an ID that may be created at an interface VLAN.

Figure 7A:
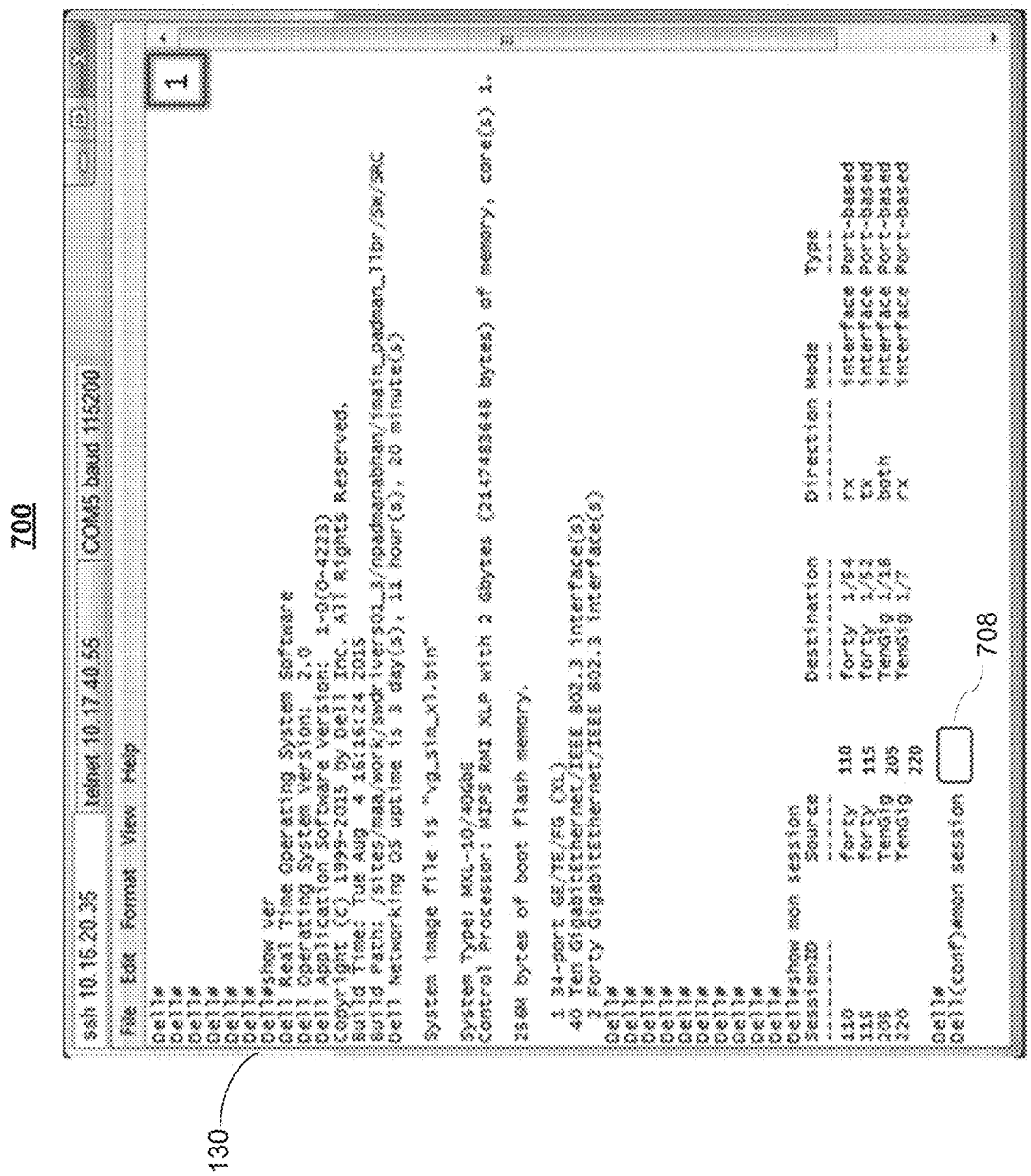
FIG. 7A illustrates how a user is prompted to input into the SNM session a parameter of a parameterized command, according to various embodiments of the present disclosure.

FIG. 7A illustrates how a user is prompted to input into the SNM session a parameter of a parameterized command, according to various embodiments of the present disclosure. Once the command is injected, the IHE recognizes that the monitoring session number "300" is a parameter listed in the documentation viewer window 120 and presents the session number as input parameter to the current command line of the SNM session. In embodiments, because the IHE has already learned the configuration state of the network device (e.g., by using the "show running" command, as discussed with respect to FIG. 2, and the subsequent "show mon session" command), the IHE may present (e.g., in a drop-down or pop-up list) a set 702 of known existing parameters, here, source interface IDs 110, 115, 205, 220 that are the IDs of the monitoring session themselves, thus, providing the user with an option enter a session ID to change the present monitoring session to another existing, independent monitoring session to modify or specify parameters for that session (e.g., change source port, destination port, direction, and other parameters).

Figure 7B:
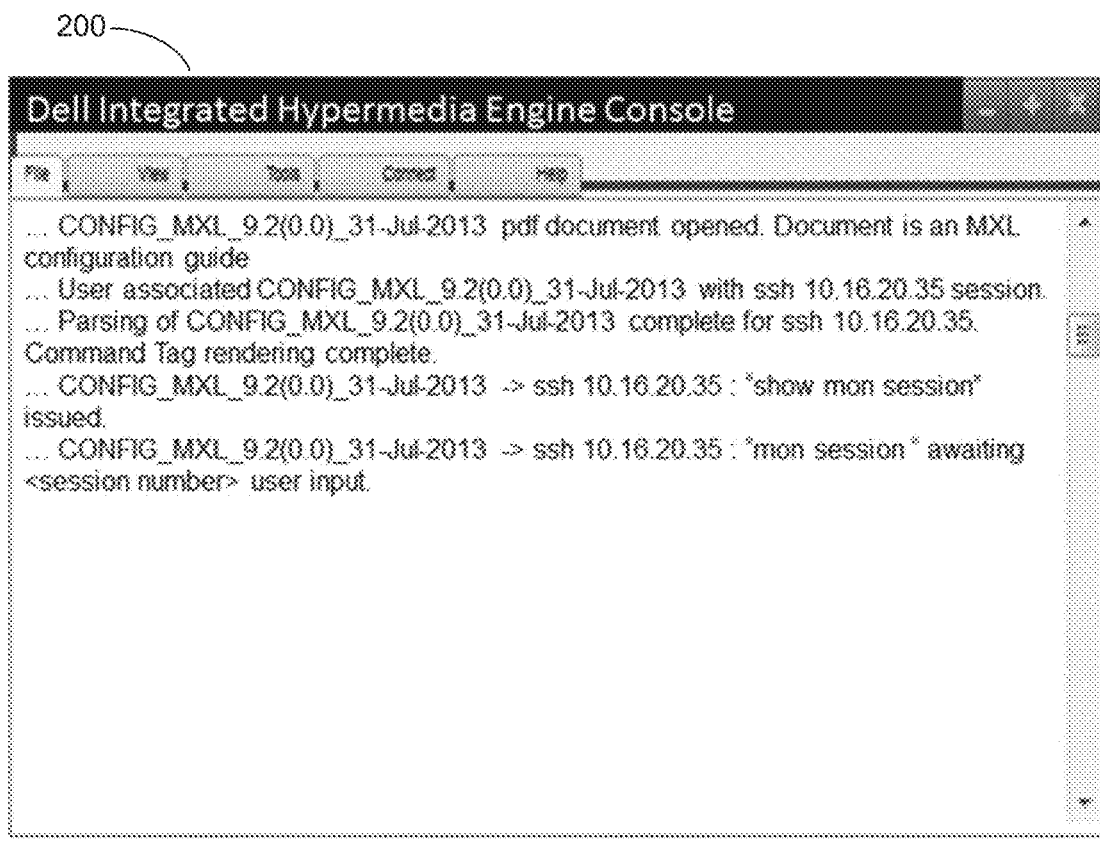
FIG. 7B illustrates how the console indicates to the user that input for the parameterized command is requested, according to various embodiments of the present disclosure.

In embodiments, the user may also use the command to enter a new session ID to create a new session. As shown in FIG. 7A, the IHE further presents blank input box 708 as an option to the user, who may create a new session, e.g., by touching blank box 708 and entering a new monitoring session number via a soft QWERTY keyboard or, if voice command is configured/enabled for that particular parameter, via a voice input method. Accordingly, the console in FIG. 7B may indicate to the user that the system awaits user input for the requested parameter.

Figure 8A:
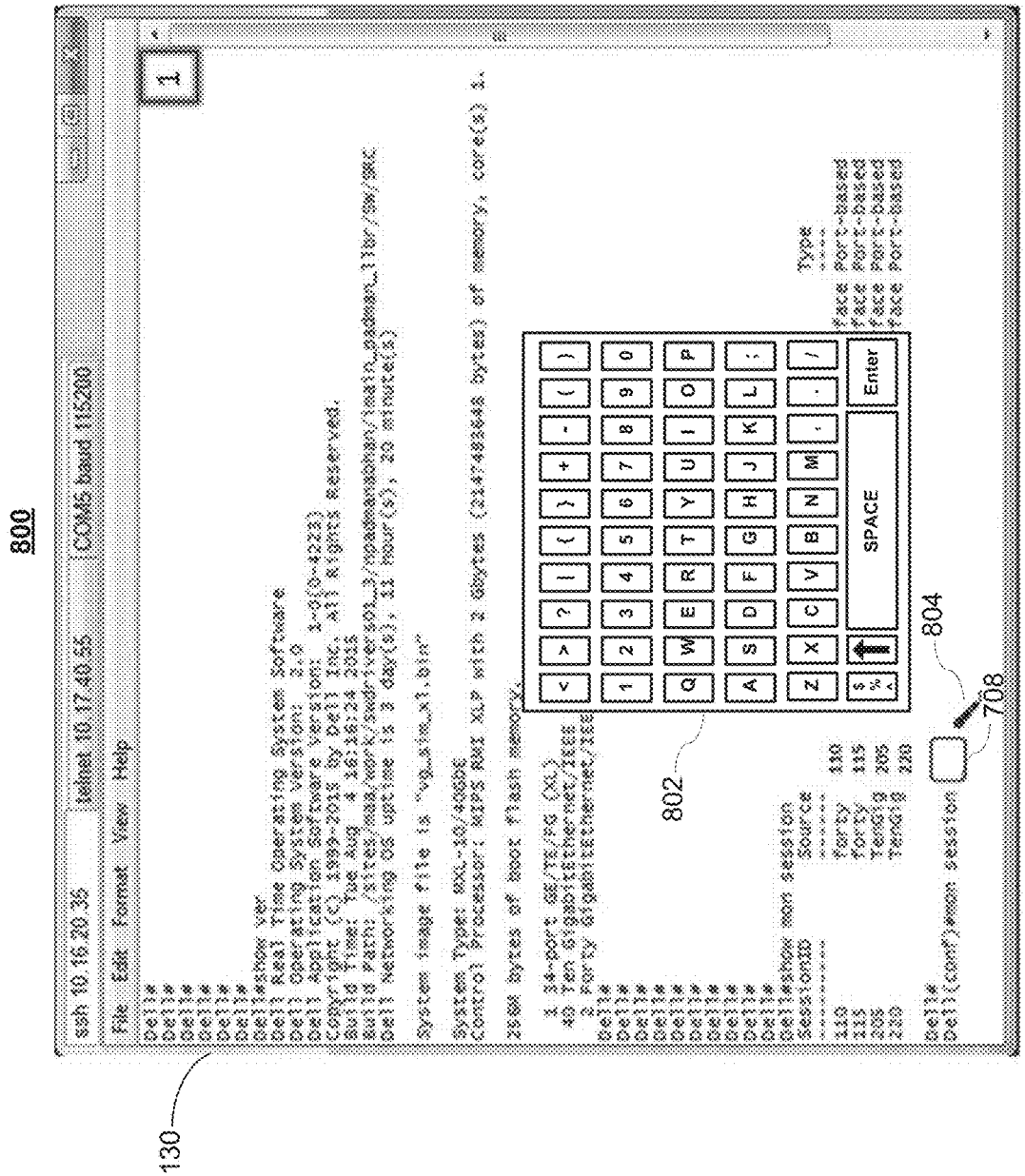
FIG. 8A illustrates an exemplary method to capture parameters according to various embodiments of the present disclosure.
Figure 8B:
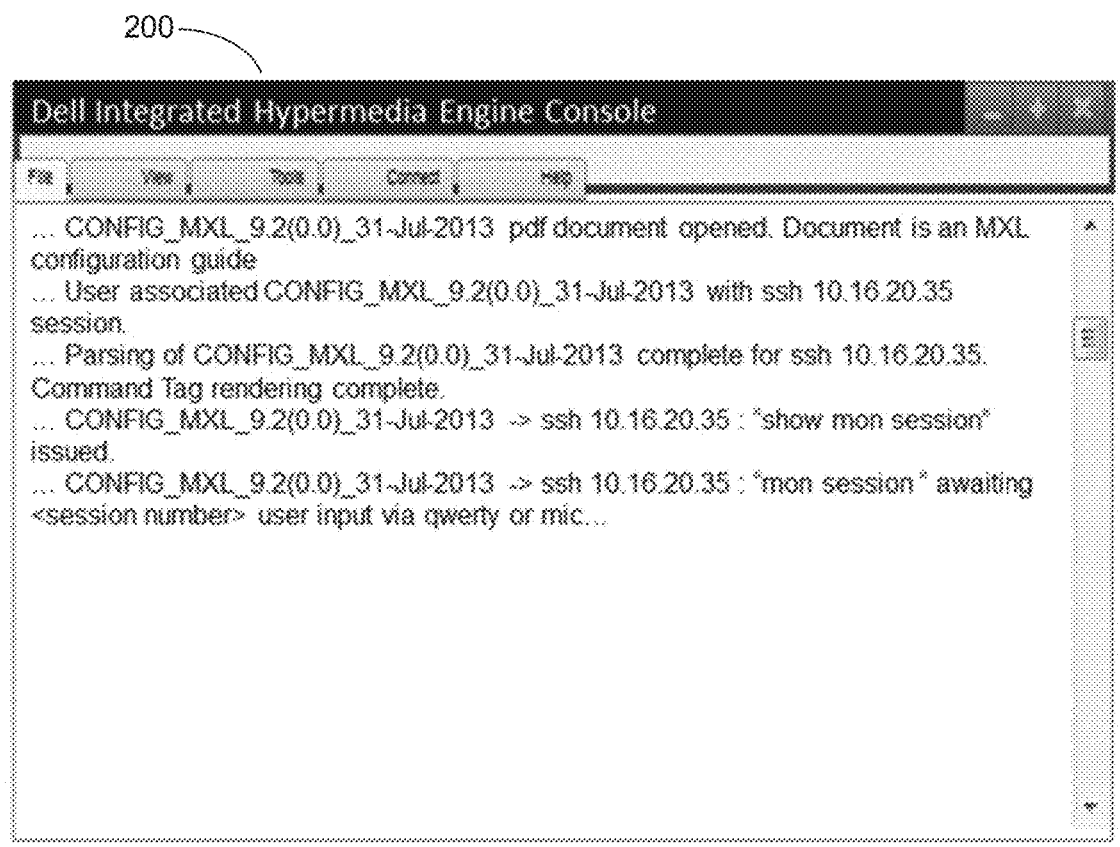
FIG. 8B illustrates how the console indicates the parameter input requirement via a specific device, according to various embodiments of the present disclosure.

FIG. 8A illustrates an exemplary method to capture parameters, according to various embodiments of the present disclosure. As shown in FIG. 8A, a QWERTY keyboard 802 and a microphone icon 804 that is located close to blank box 708 prompt for an input of a parameter of the parameterized command. In embodiments, the voice input is received via a microphone and filtered for unwanted content. For example, permissible input numbers for a valid session number may be limited to maximal three digits, such that if the input is not recognized as a valid number, the voice input is rejected. According to various embodiments of the present disclosure, console 200 in FIG. 8B indicates that parameter input is required via one or more devices. One skilled in the art will appreciate that based on device capabilities, gesture-based inputs may also be possible. A person skilled in the art will further recognize that by combining the ability to extract commands from documentation coupled with the use of embedded inline GUI panels, voice and gesture-based inputs, the need to use key-strokes on a conventional keyboard is greatly minimized.

Figure 9A:
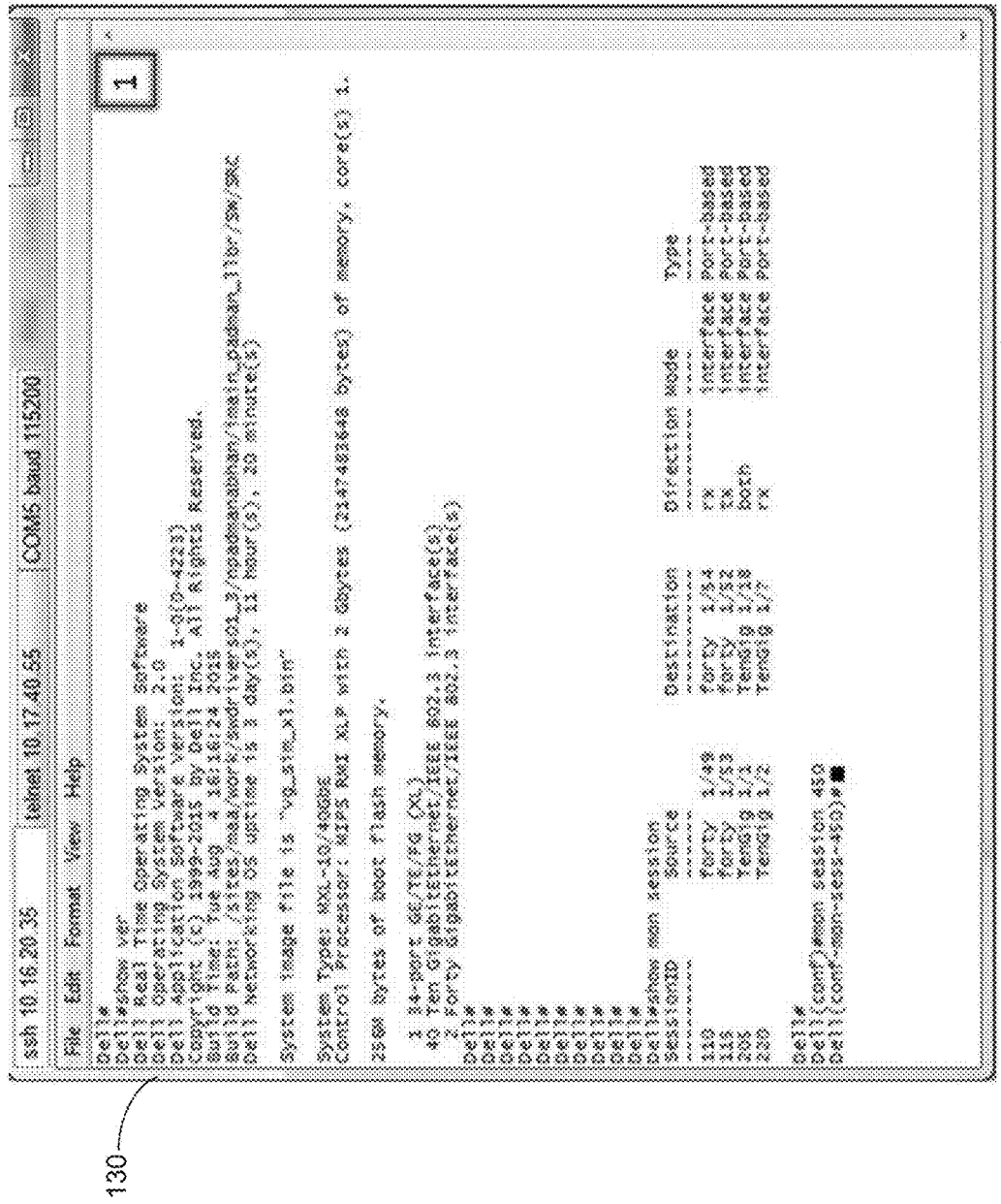
FIG. 9A illustrates how an SNM session receives user input for a parameterized command, according to various embodiments of the present disclosure.
Figure 9B:
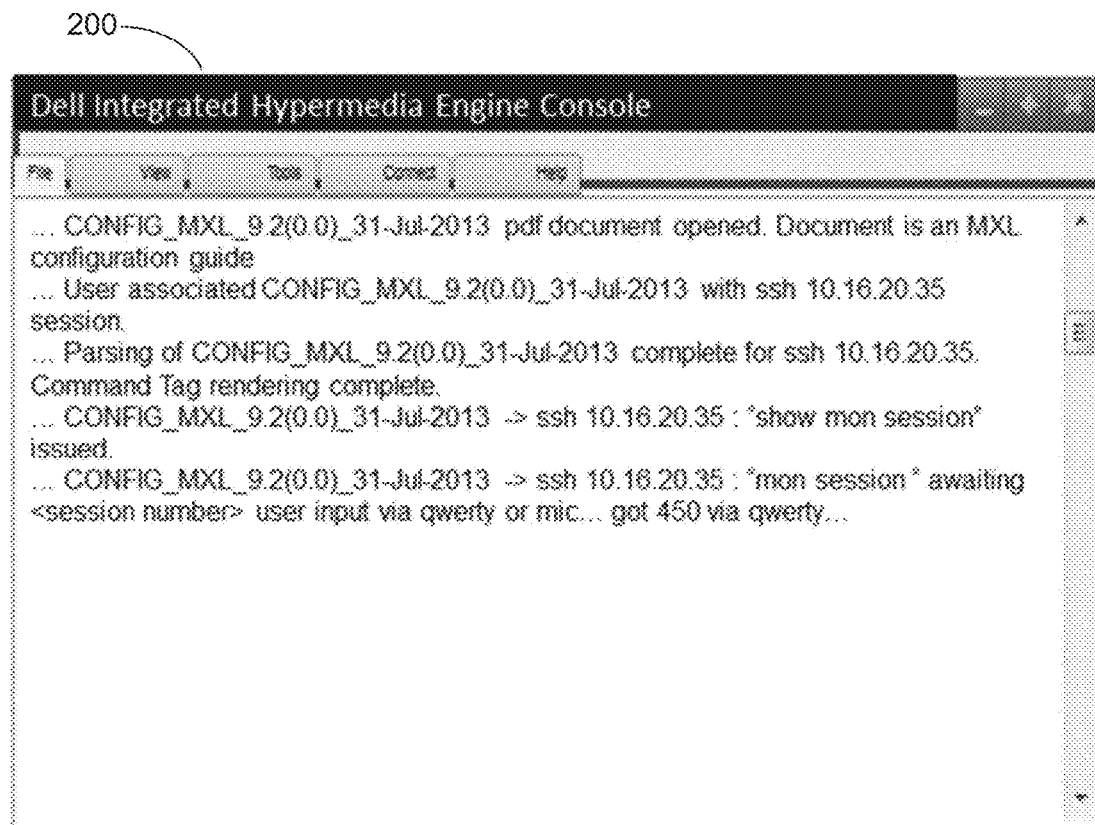
FIG. 9B illustrates how the console indicates the method by which a requested session parameter has been received.

In embodiments, once the user enters a valid input via any acceptable input method, the IHE constructs and issues the command associated with that input. The command may then be executed in the backend session at the switch, and the output of the switch may be reflected in the CLI session in SNM session window 130 accordingly. FIG. 9A illustrates how the SNM session receives user input for a parameterized command, according to various embodiments of the present disclosure. After the user choses the session number (here "450") in the mon session command, e.g., by using the QWERTY keyboard shown in FIG. 8A, the "show mon session" command is executed and the CLI session enters into a configuration mode that allows the user to configure the source and destination interfaces and the direction. In FIG. 9B, the console indicates that the requested session parameter has been received via a QWERTY-style keyboard.

Figure 10A:
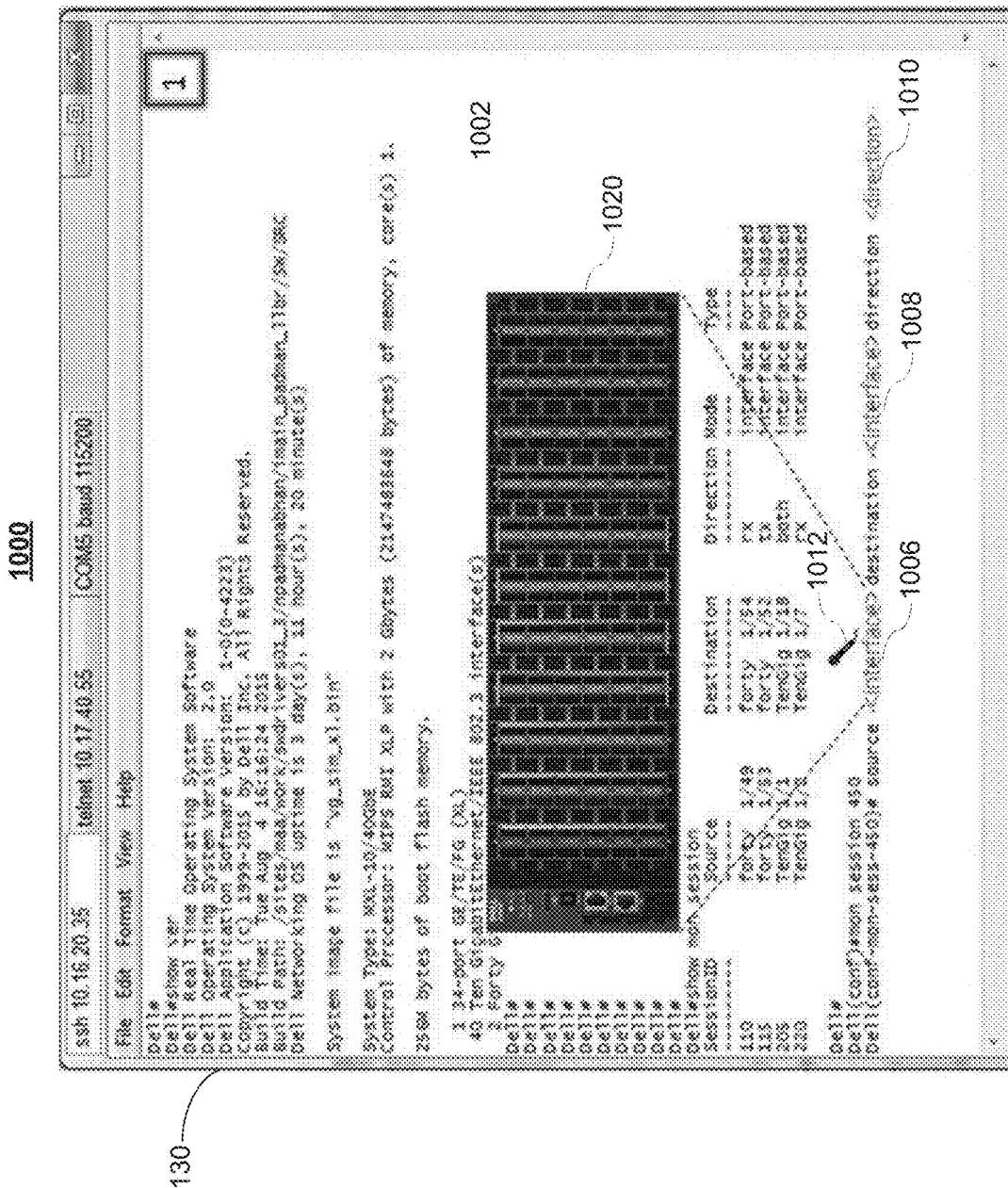
FIG. 10A-12B illustrate how an SNM session awaits user input for the individual parameters of a multi-parameter command, and corresponding console logs, according to various embodiments of the present disclosure.
Figure 10B:
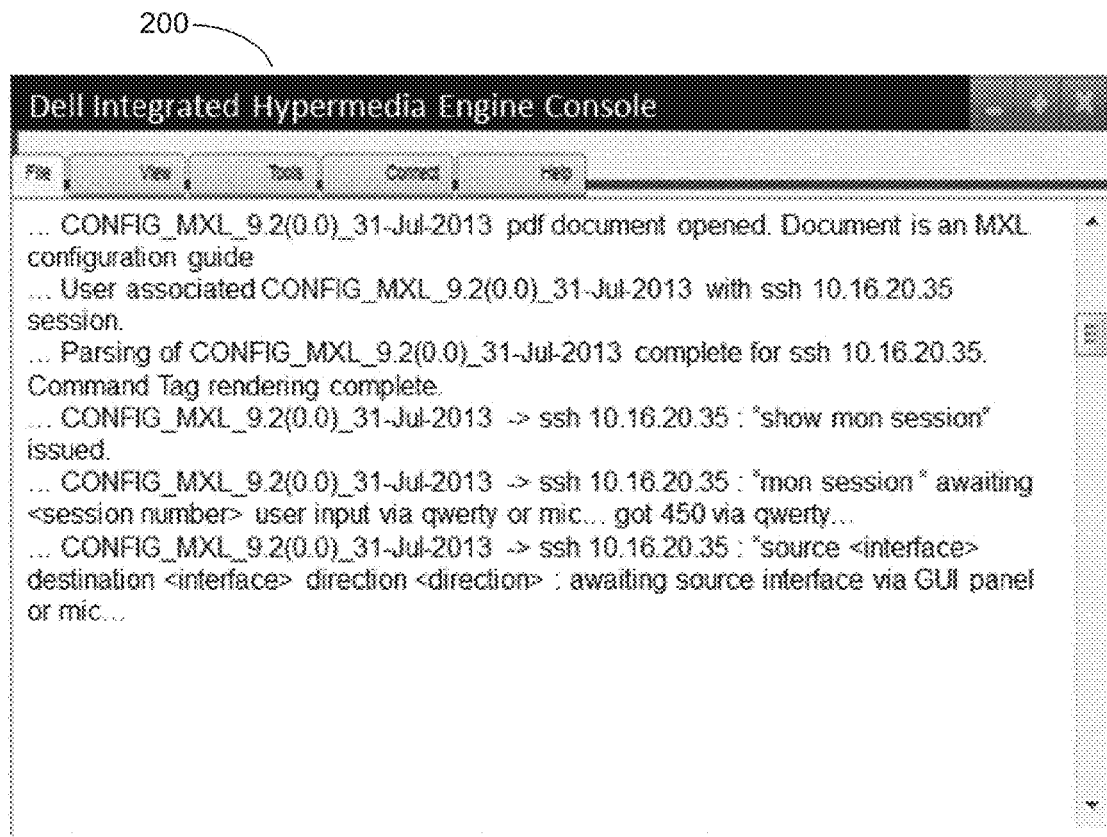

When the injected command has multiple parameters, in embodiments, the IHE guides the user through each parameter presenting to the user options how to input data. Based on user settings and device availability, user input may be received via a GUI, a voice input interface, and the like. In example in FIG. 10A, in response to the user selecting the tag next to command "source tengig 0/17 destination tengig 0/1 direction tx" 1004, the IHE recognizes that "tengig 0/17," tengig 0/1," and "tx" are parameters in document 1002 and translates the parameters to respective <interface> 1006, <interface> 1008, and <direction> 1010 in the command line buffer window of CLI console 200 session. The IHE further presents the user with a choice to input the source interface parameter via either a GUI panel or a voice input interface using a microphone, the positioning of microphone icon 1012 clearly indicating the nature of input that is being sought. In other words, the location of microphone icon 1012 helps indicating to the user that any non-interface input would be rejected. Inline GUI panel 1020 represents the port front panel of the network device and allows the use to select a port via the touchscreen. One skilled in the art will appreciate that other CLI commands may present inline GUI panel representations that contain FAN array, PSUs, sensors, and other user identifiable entities to collect inputs.

Figure 11A:
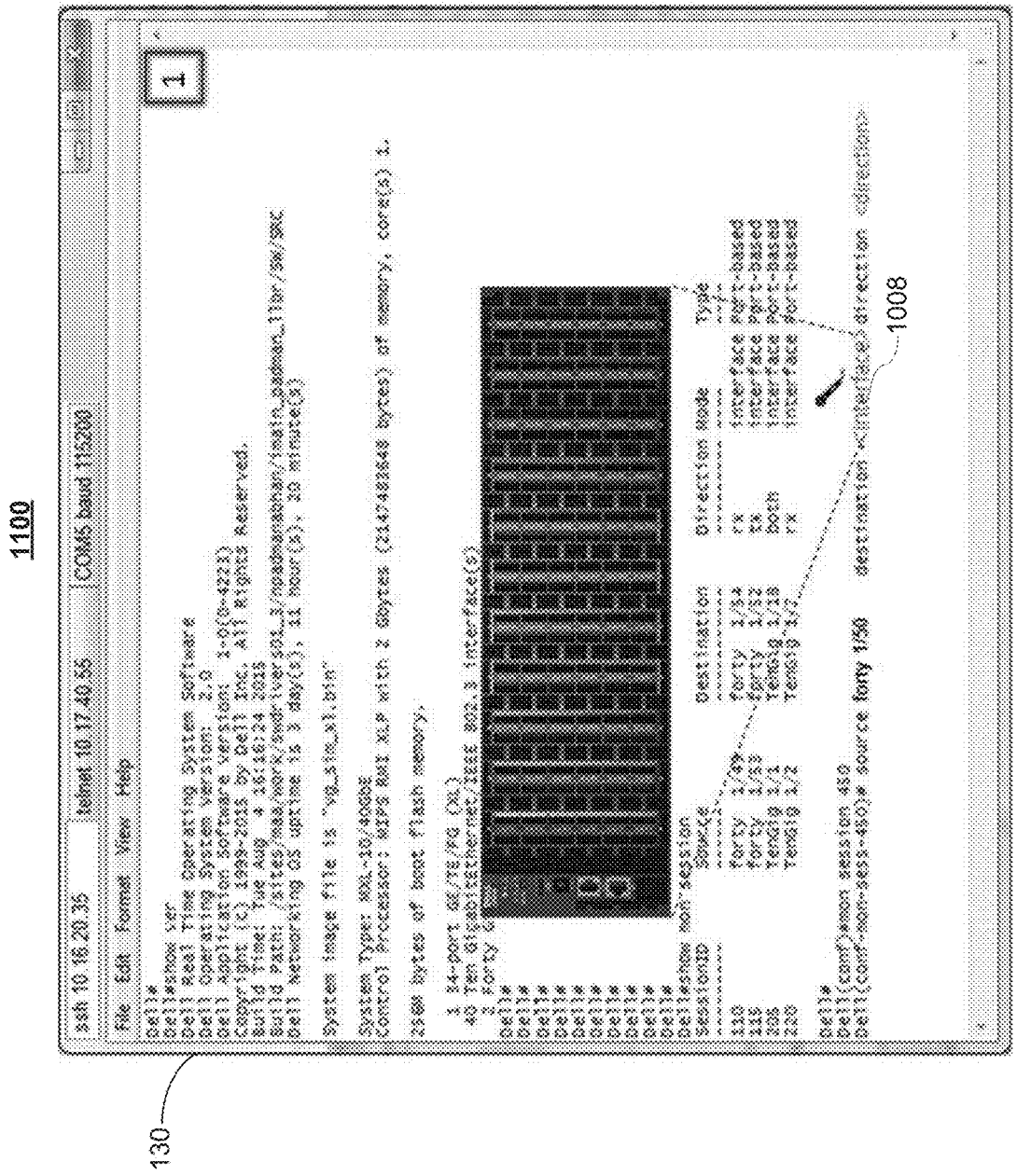
Figure 11B:
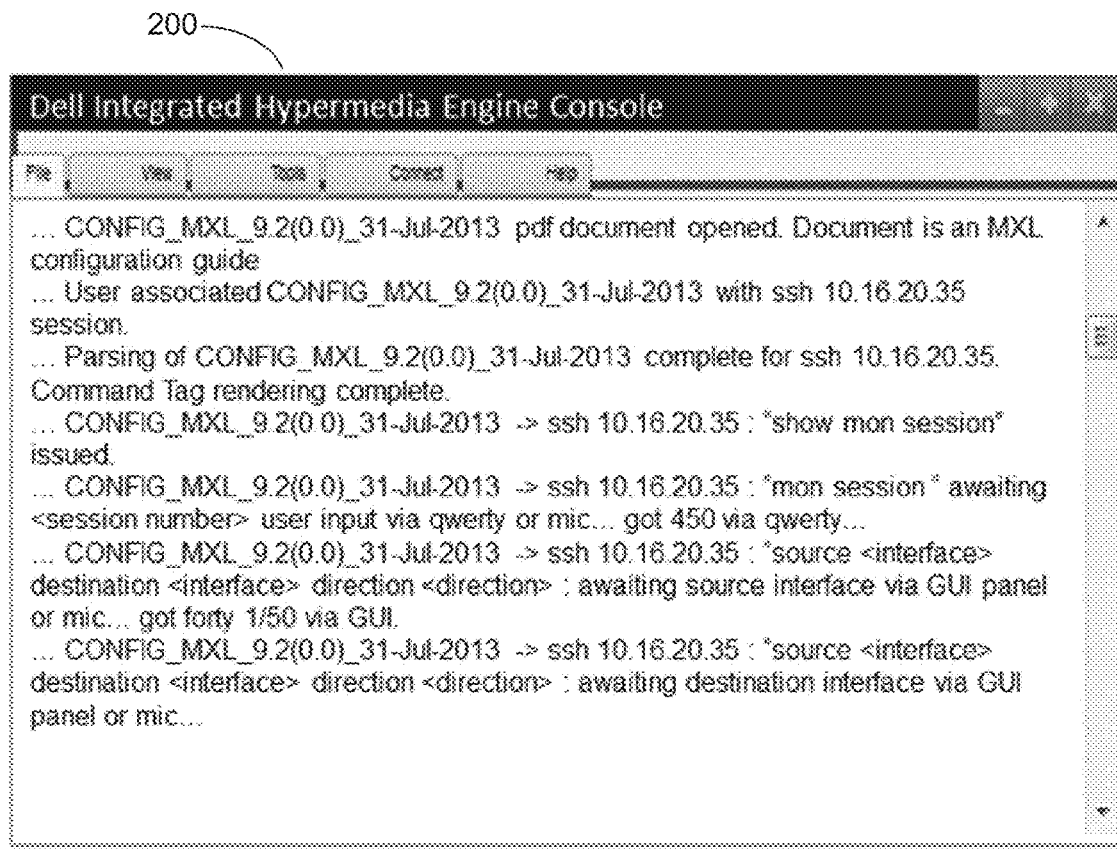

FIGS. 11A and 11B illustrate how the SNM session awaits user input data for the second parameter, destination parameter <interface> 1008, and the corresponding console log.

Figure 12A:
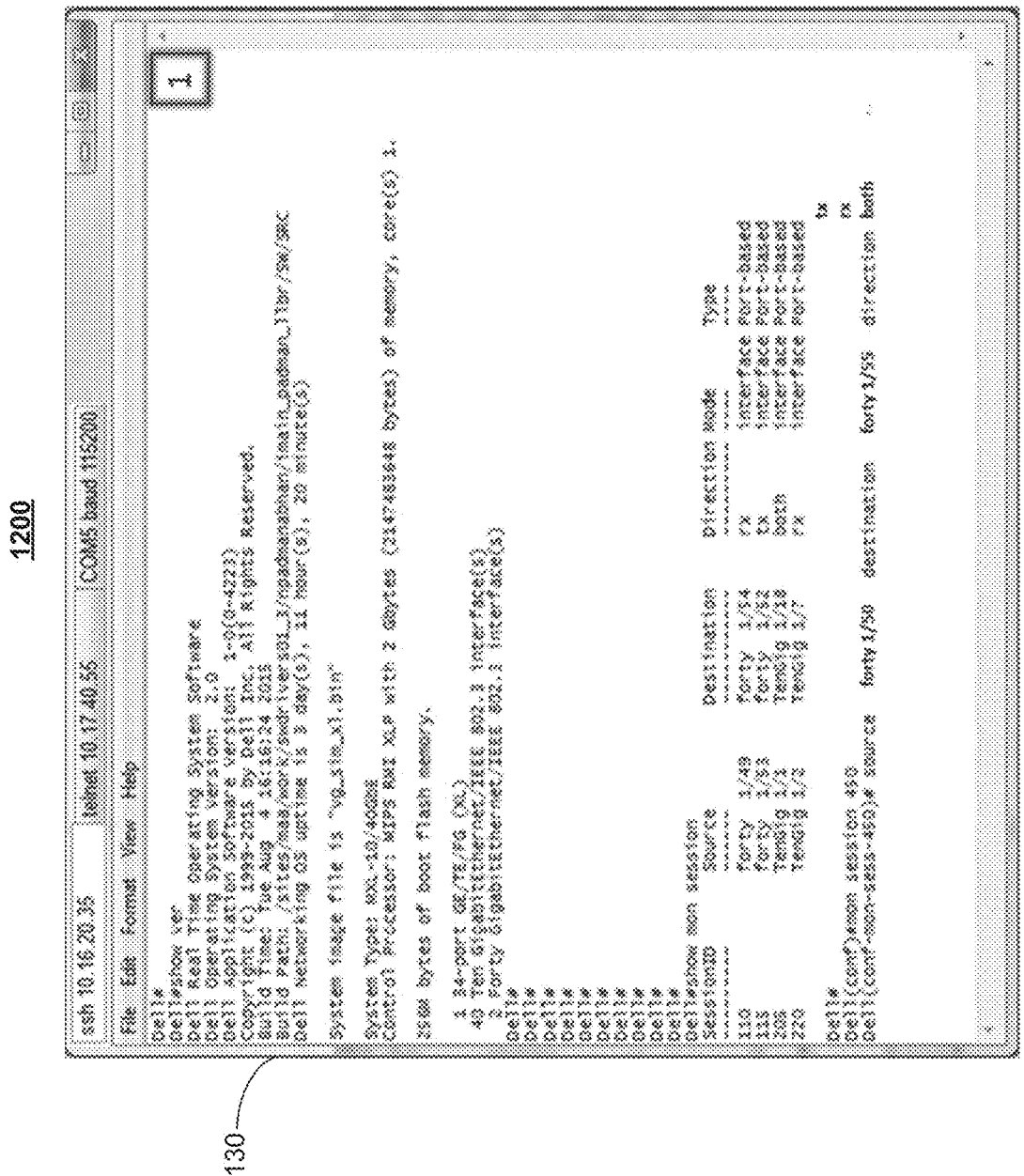
Figure 12B:
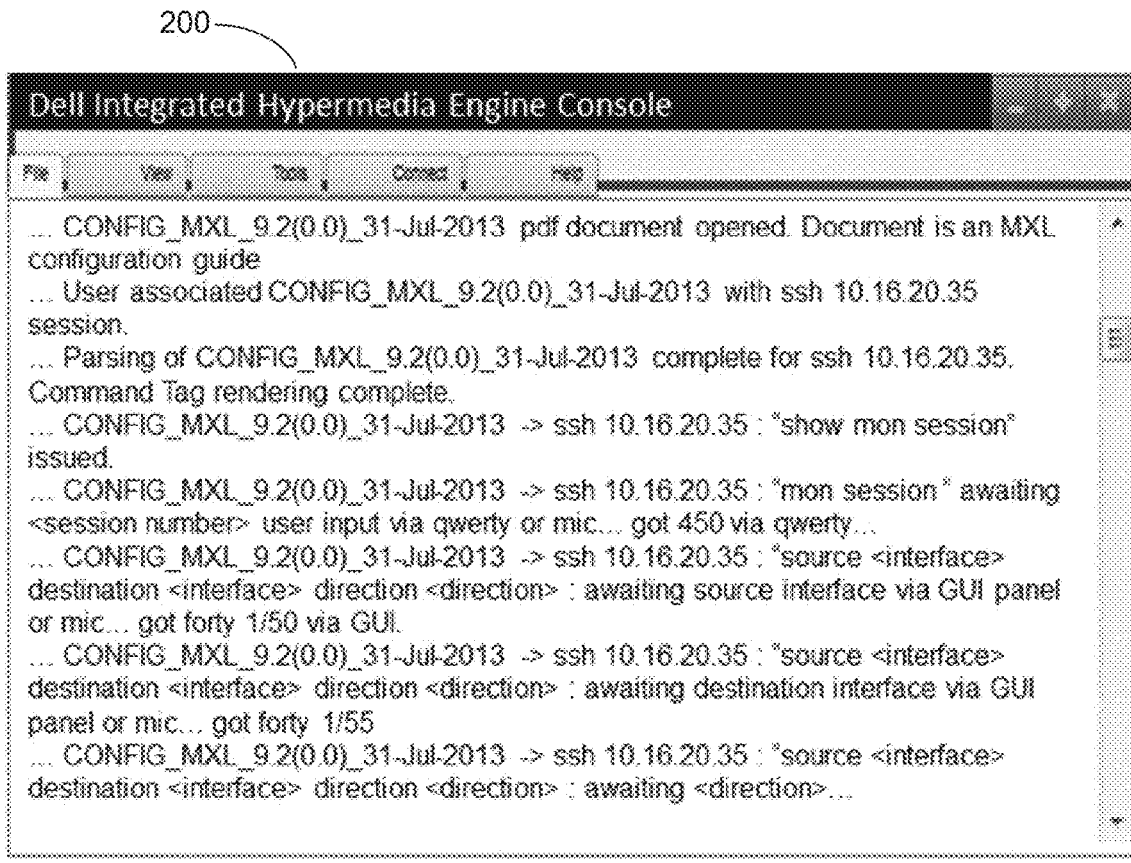
Figure 13A:
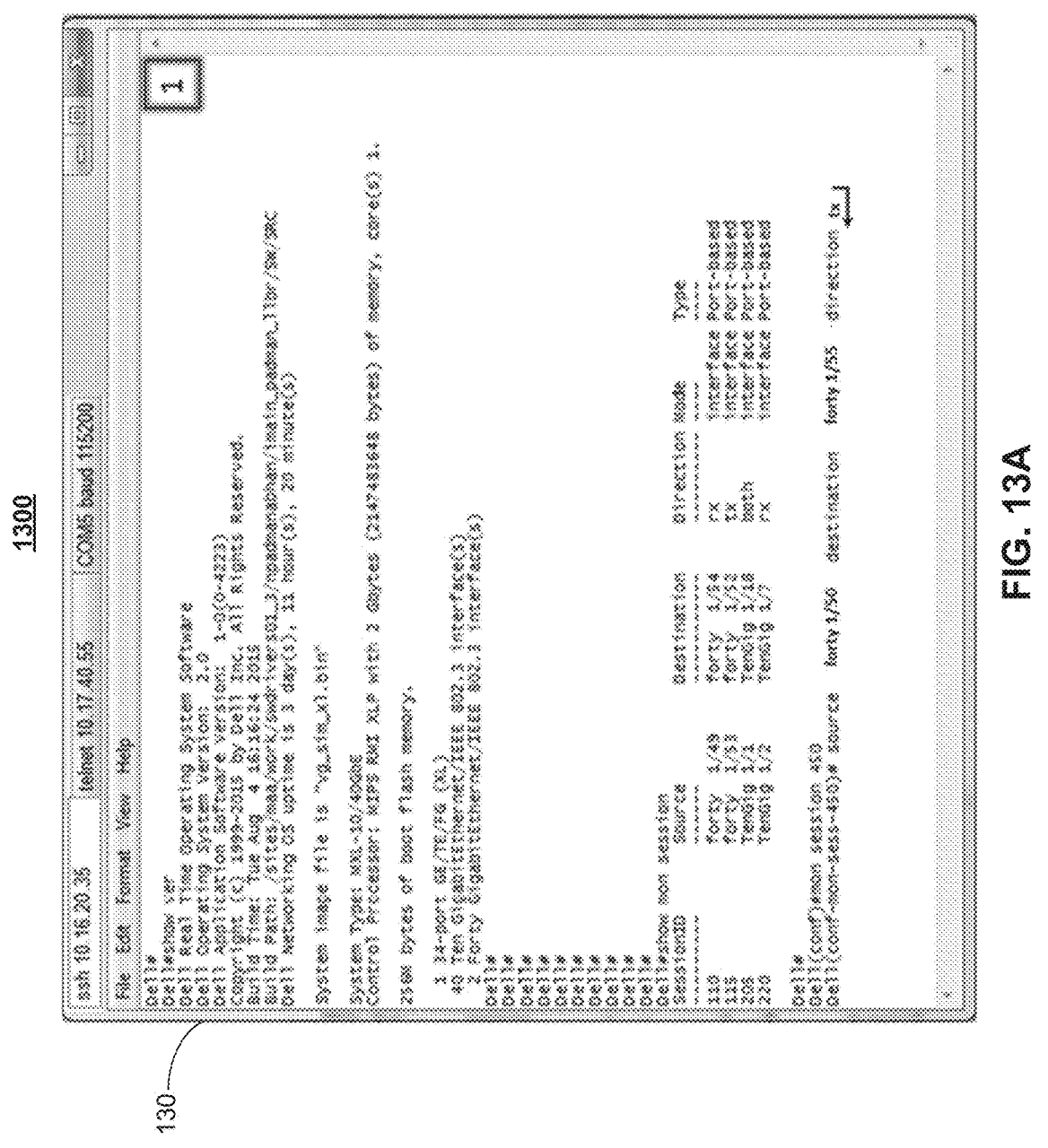
Figure 13B:
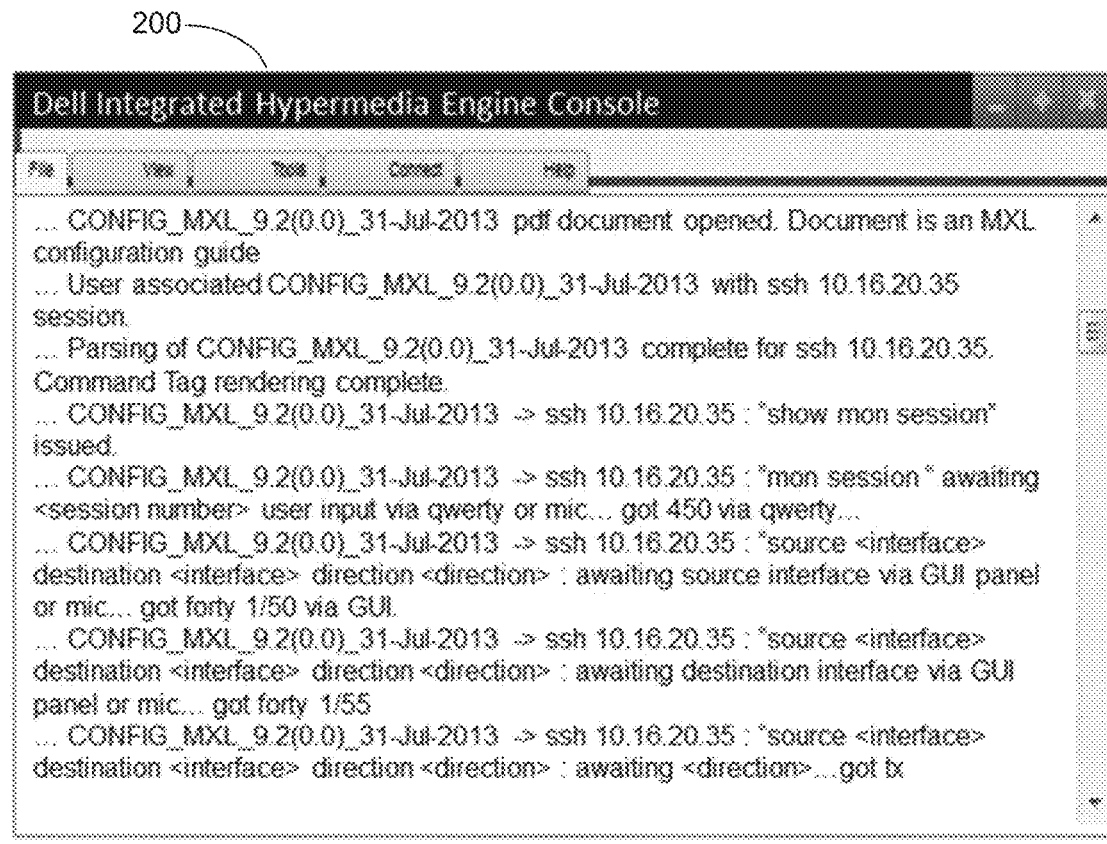
FIG. 13B illustrates a corresponding console logs for FIG. 13A.
Figure 14A:
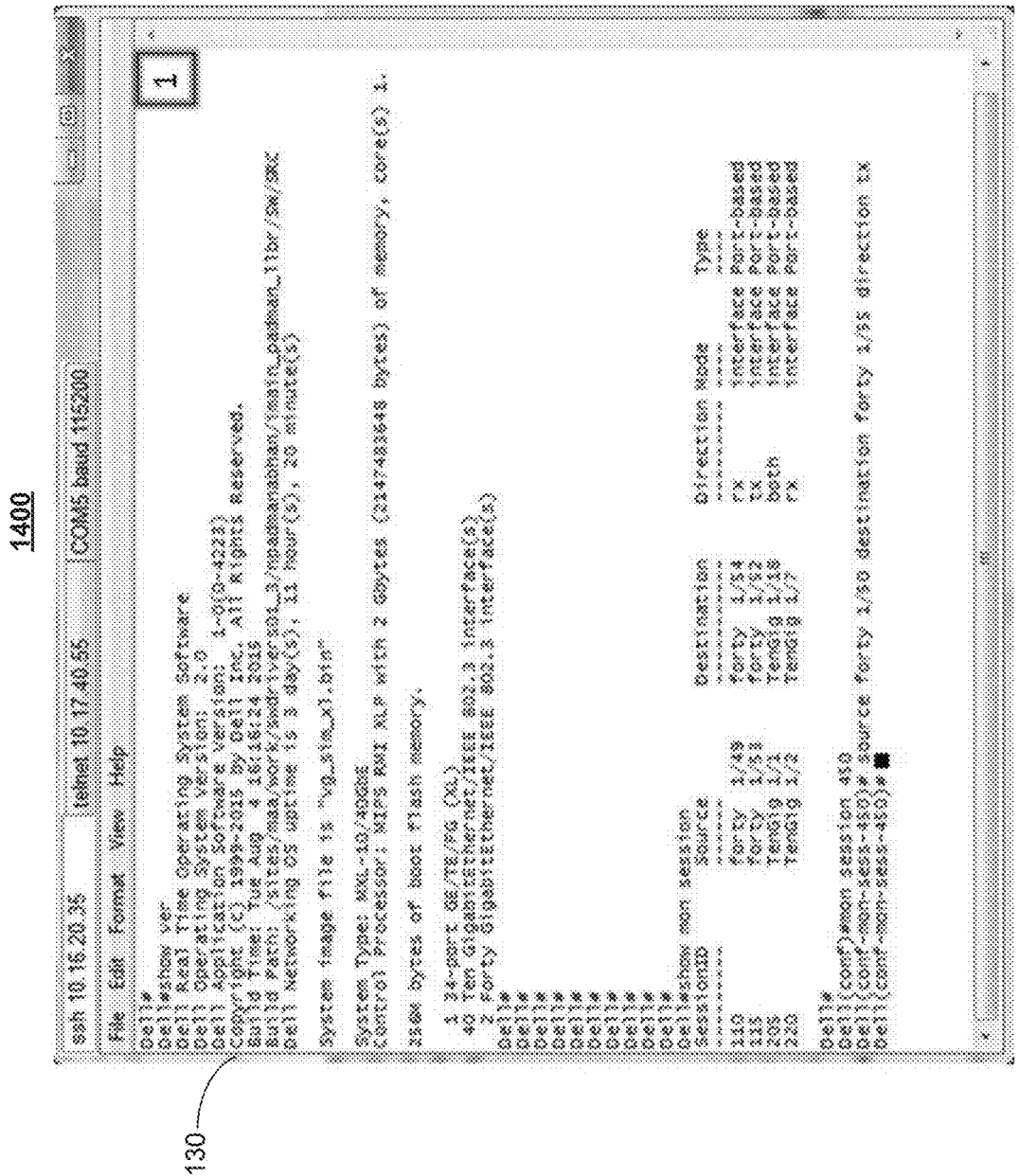
FIG. 14A illustrates how an SNM session issues a multi parameter command, according to various embodiments of the present disclosure.
Figure 14B:
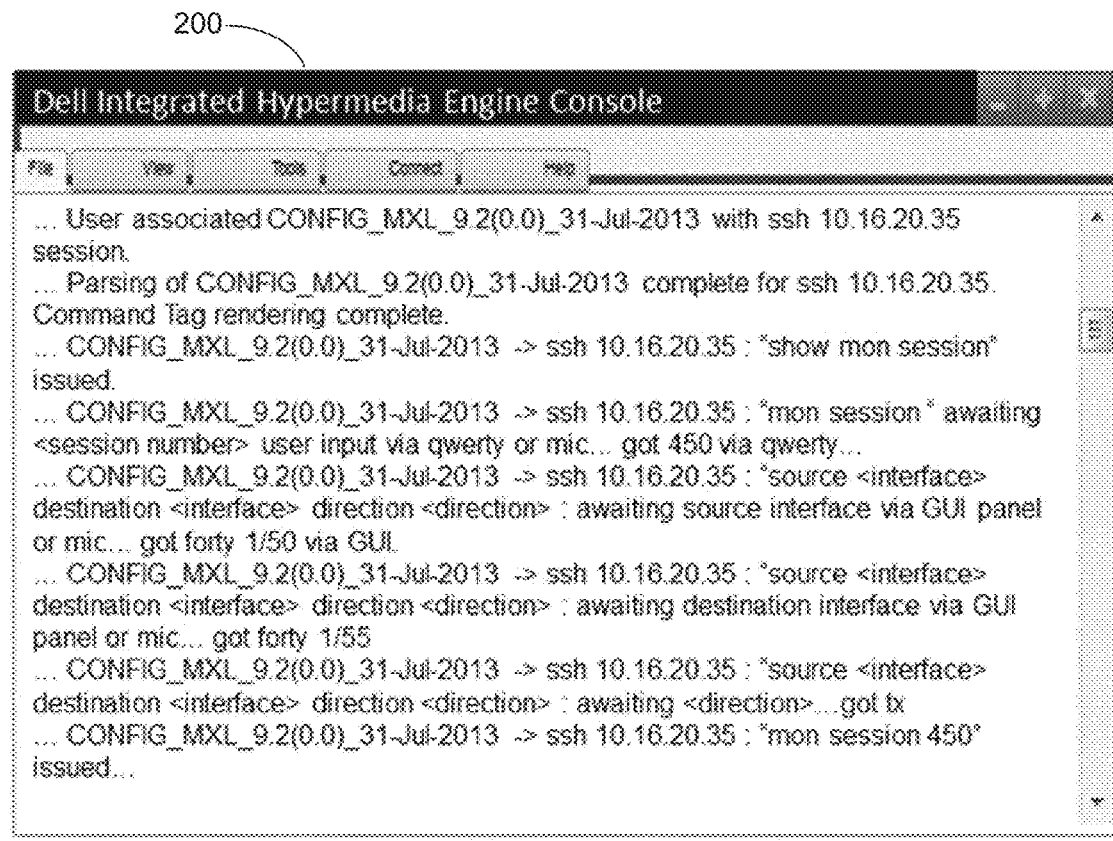
FIG. 14B illustrates a corresponding console log for FIG. 14A.

FIGS. 12A and 12B illustrate how the SNM session awaits user input data for the session's parameter <direction>, and the corresponding console log. In embodiments, once a command is completely constructed in the current command line buffer of the CLI session, depending on user preferences, the command may be issued either immediately or, in response to user confirmation. In FIG. 13A, illustrates how the console requires explicit confirmation by prompting the user to touch the "Enter" key icon adjacent to the command for the command to be successfully executed. FIG. 13B illustrates a console log corresponding to FIG. 13A. FIGS. 14A and 14B illustrate how the SNM session issues the multi parameter command, and a corresponding console log.

In embodiments, the IHE is context aware with respect to both the document viewer and the CLI session, i.e., the IHE does not necessarily treat each injectable command in the document viewer independently, but rather within the context of the documentation, the relationship between tagged commands, and the status of a CLI or GUI. The IHE continuously learns the current configuration state of the network device as well as the state of the current SNM session window. In embodiments, the IHE is aware of CLI modes (EXEC, EXEC-privilege, CONFIG, and interface) etc., and automatically enters and exits the corresponding modes based on a selected command.

Figure 15A:
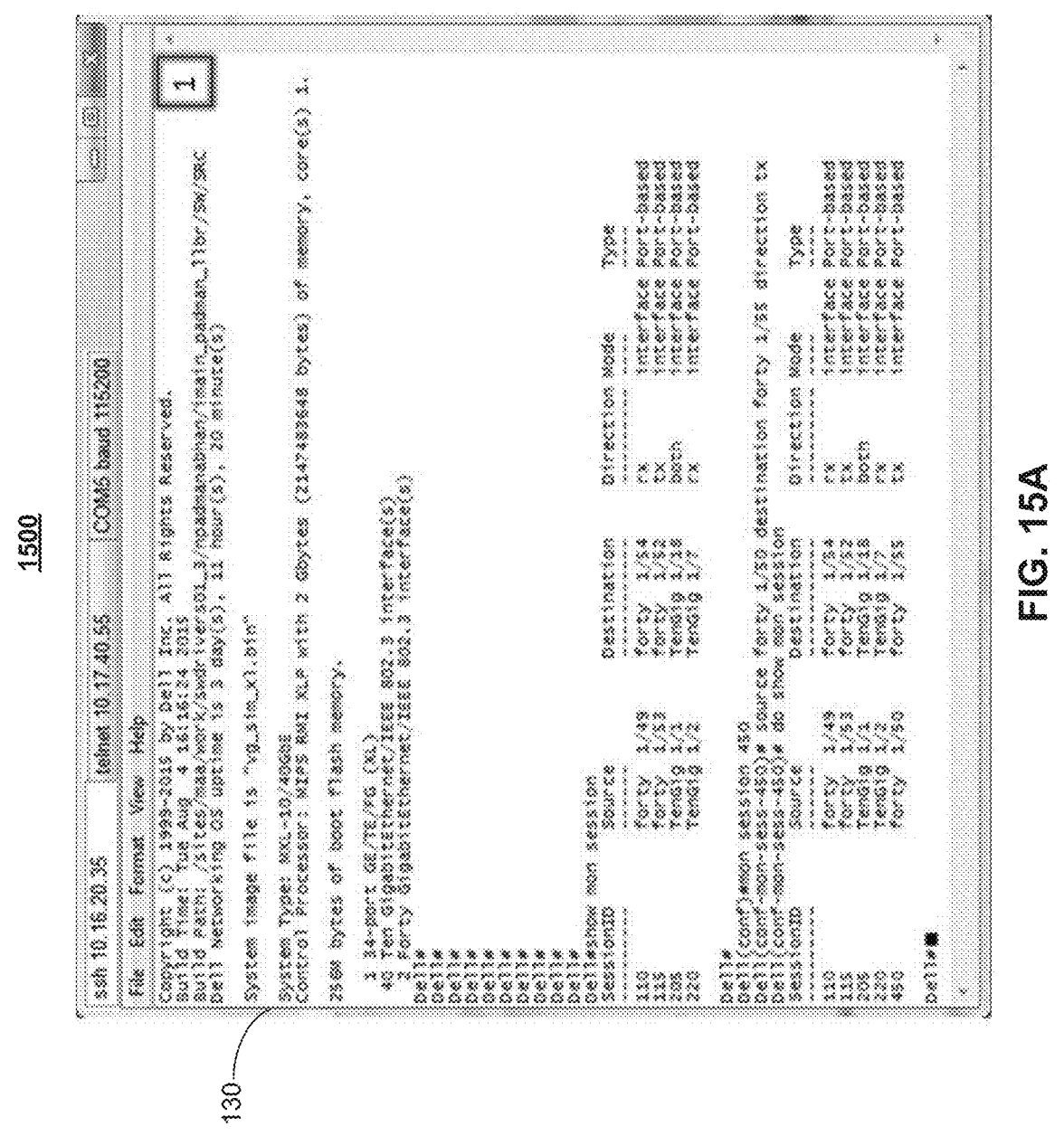
Figure 15B:
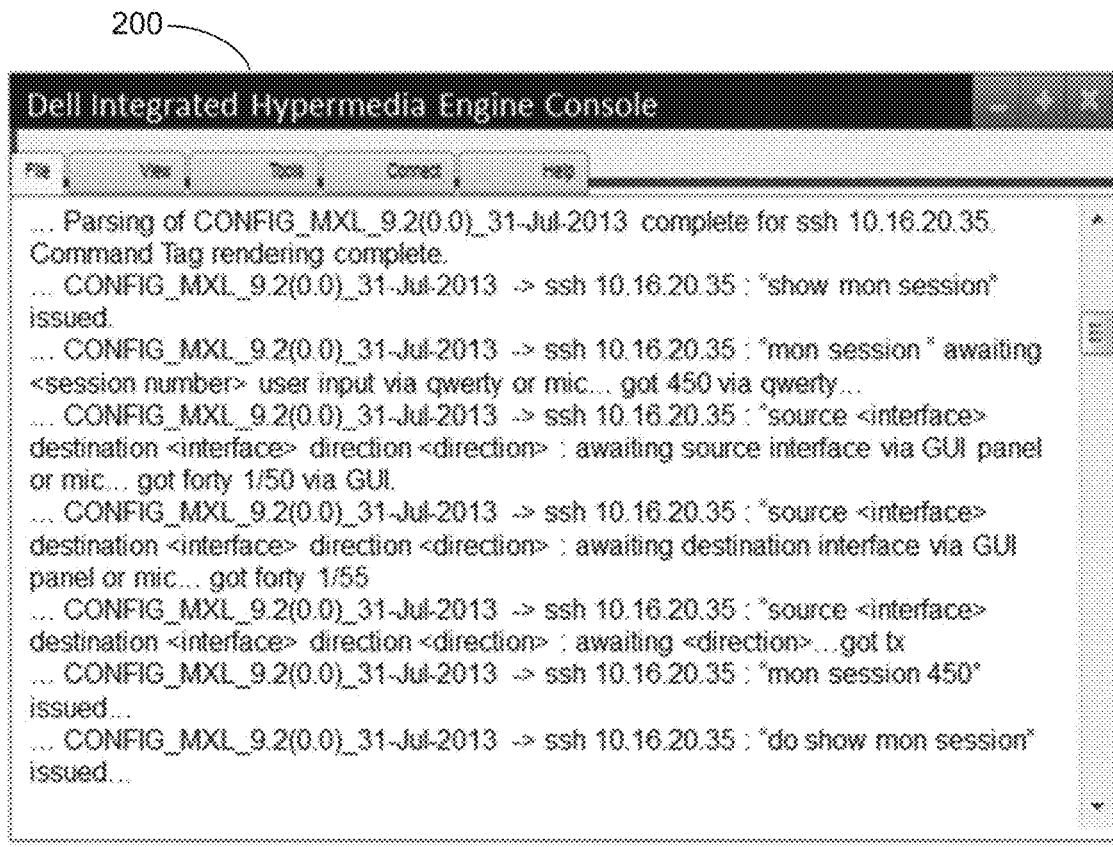
FIG. 15B illustrates a corresponding console log for FIG. 15A.

FIG. 15A illustrates context-awareness with respect to a document viewer window and a SNM session, according to various embodiments of the present disclosure. FIG. 15 shows that if the CLI session is in configuration mode and the user selects in the document viewer window a tag that corresponds to "show mon session," the IHE translates the command into "do show mon session" and executes that command in the CLI window.

Figure 16:
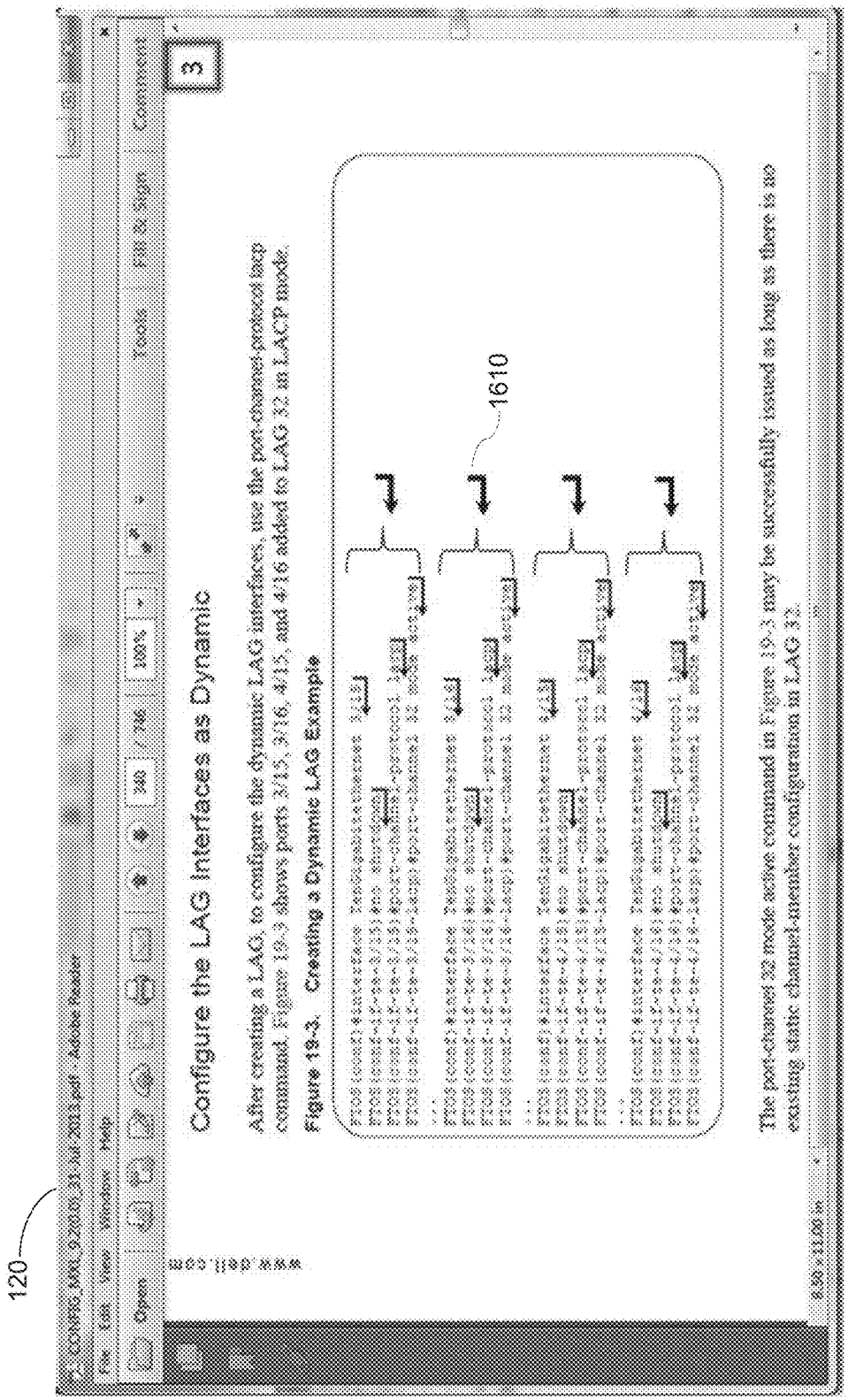
FIG. 16 illustrates how to inject and undo injection of a plurality of commands in bulk mode an SNM session, according to various embodiments of the present disclosure.

FIG. 16 illustrates how to inject and undo injection of a plurality of commands in bulk mode an SNM session, according to various embodiments of the present disclosure. In embodiments, in order to enable entry of a number of commands at the same time a particular tag may be used to input commands in "bulk mode" and "as is" without having to engage in multi-line parameter substitution. In example in FIG. 16, "bulk Enter" tag 1610 located to the right of braces "}" is used to serve as a tag for simultaneously entering four corresponding commands. In this example, the IHE does not perform a line-by-line "paste" into the CLI session, rather it determines the proper order in which the commands are to be injected into the CLI session.

As previously indicated, the document viewer is not restricted to any CLI configuration or command reference documents. Therefore, in embodiments, the user may open, for example, a blank text document to enter to-be-parsed text for the IHE. FIG. 17 illustrates the use of a scratchpad as a document source, according to various embodiments of the present disclosure. The notepad document (cli_command-_scratchpad.txt), shown in FIG. 17, is opened by the user, who pasted text from a clipboard into the notepad document. Upon association with a CLI session, the tags are rendered. Furthermore, just as it is possible to enter commands in bulk, it is possible to undo more than one command at a time. Therefore, in embodiments, the user may use a tag, such as the "bulk undo" tag (shown in FIG. 18 and denoted as 1810) adjacent to the "bulk Enter" tag 1720 in FIG. 17, to simultaneously undo a plurality of commands.

Figure 18:
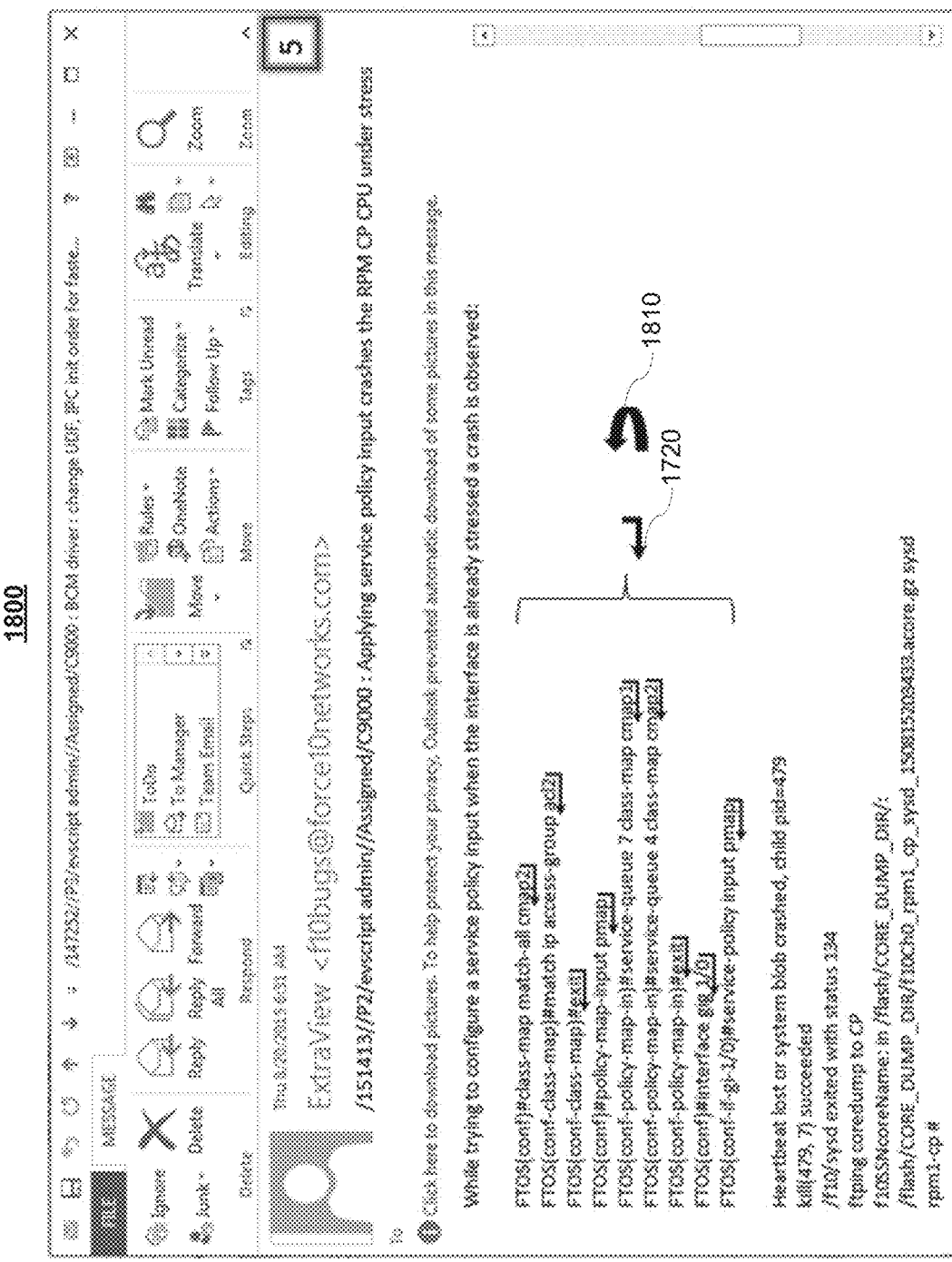
FIG. 18 illustrates the use of an email message as a document source, according to various embodiments of the present disclosure.

In embodiments, the IHE does not merely add the prefix "no" to the list of to-be-deleted commands; rather, the IHE determines a proper order in which the commands should be negated before injecting them to the CLI session. For example, in FIG. 17, if the user wishes to undo the configuration for TenGigabit 4/15, then the following sequence is generated and injected into the CLI session by the IHE:
 a) conf t
 b) interface TenGigabitethernet 4/15
 c) shutdown
 d) no port-channel 32 mode active
 e) no port-channel-protocol lacp FIG. 18 illustrates the use of an email message as a document source, according to various embodiments of the present disclosure. In embodiments, an instance of the document viewer is provided by an external source. As illustrated in FIG. 18, the source may be, for example, an email generated by a bug report system. This is made possible by the fact that the user may enter commands directly into the CLI session window not only by using a soft QWERTY keyboard, but also by the fact that the ICLI permits pasting text from other sources into the CLI session window (e.g., via a computer mouse). In embodiments, if the user enters a command directly in the SNM session window, the IHE automatically navigates to the relevant section of the document using the document viewer, so that the user does not need to scroll back and forth within the document.

Figure 19:
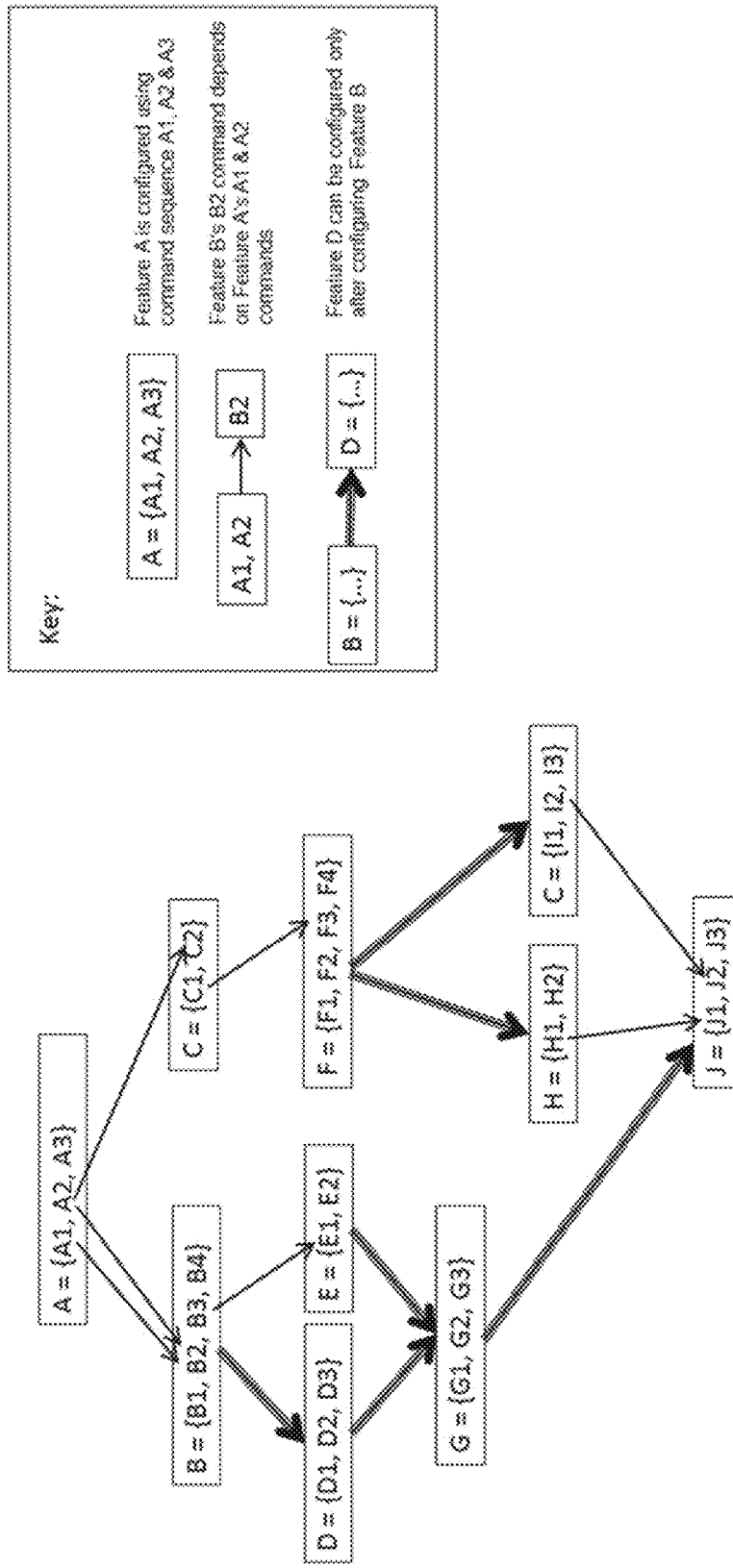
FIG. 19 illustrates multi-tiered switch configurations with dependencies, according to various embodiments of the present disclosure.

FIG. 19 depicts multi-tiered switch configurations with dependencies among features according to various embodiments of the present disclosure. In embodiments, maintaining dependencies involves using features of a (e.g., imported) dependency tree. Once the user configures feature A in dependency tree 1900 in FIG. 19, the IHE provides the user with an option to navigate to relevant locations in document sources for features B or C using the document viewer. In embodiments, once features D or E have been configured, the IHE optionally auto-generates the CLI commands for feature G and places onto a clipboard with embedded tags and brings up the GUI panels in the spliced session window. If the user attempts to configure feature J, the IHE issues an error warning and auto-navigates to the documentation sections that show features G/H or I that are necessary for completing the dependencies, thereby, proactively guiding the user.

Figure 20:
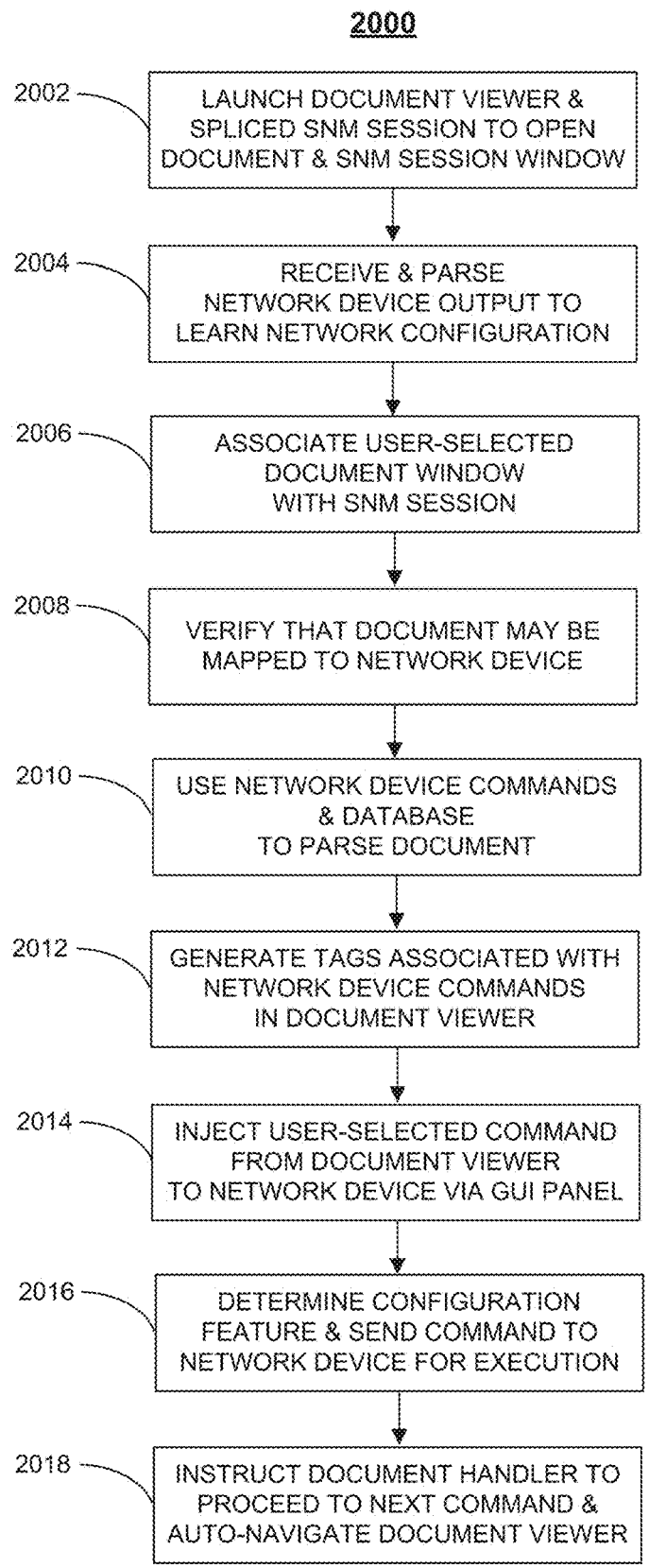
FIG. 20 is a flowchart of an illustrative process for accelerating user interactions on touchscreen devices, in accordance with various embodiments of the present disclosure.

FIG. 20 is a flowchart of an illustrative process for accelerating user interactions on touchscreen devices, in accordance with various embodiments of the present disclosure. The process for accelerating user interactions starts at step 2002 when a document viewer and an SNM session window for a spliced SNM session are launched, e.g., via an IHE. The document viewer may be launched by a document handler and, respectively, the SNM session window may be launched by a SNM session. The SNM session window may be used to establish a back-end connection between the SNM session and a network device.

At step 2004, a network device output is received, and may be communicated to the SNM window via the spliced SNM session. In embodiments, the output may be received in response to connecting, via the back-end connection, to the network device and sending appropriate commands to elicit a response by the network device, and may be parsed to learn about the network device and/or a network connection, for example, a configuration state of the network device 2002.

At step 2006, for example in response to a user selecting a document viewer window and the SNM session window, the user-selected document window is associated with the SNM session, for example, by the IHE.

At step 2008, it is verified that the document may be mapped onto the network device. Verification may be performed by the IHE, for example, based on the type of the document in the document viewer window.

At step 2010, the document is parsed, for example, by identifying network device commands in the document. In embodiments, parsing is performed by the document handler that selects from a database provided by the IHE a list of commands that is compatible with the network device.

At step 2012, tags that are associated with network device commands in the document viewer are generated in the document viewer, e.g., by a document handler.

At step 2014, a user-selected command from the document viewer window is injected into the network device, e.g., via a command line of the SNM session. In embodiments, this is accomplished via an inline GUI panel that is auto-launched by the IHE to guide the user to input parameters, e.g., for parameterized commands. In embodiments, the command is modified prior to injecting it into the command line.

At step 2016, for example in response to determining a configuration feature, commands are sent to the network device for execution, for example, via the back-end connection and without any user involvement.

At step 2018, the document handler is instructed by the IHE to proceed to the next command. In embodiments, based on a sequence of commands entered by the user, the IHE may determine a feature that is being configured in the SNM window, and cause the document viewer to auto-navigate through subsequent feature configuration steps to guide the user though the document. In embodiments, the command sequence are grouped as features and based on a feature dependence tree to ensure that dependencies within the parsed document are maintained.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

Figure 21:
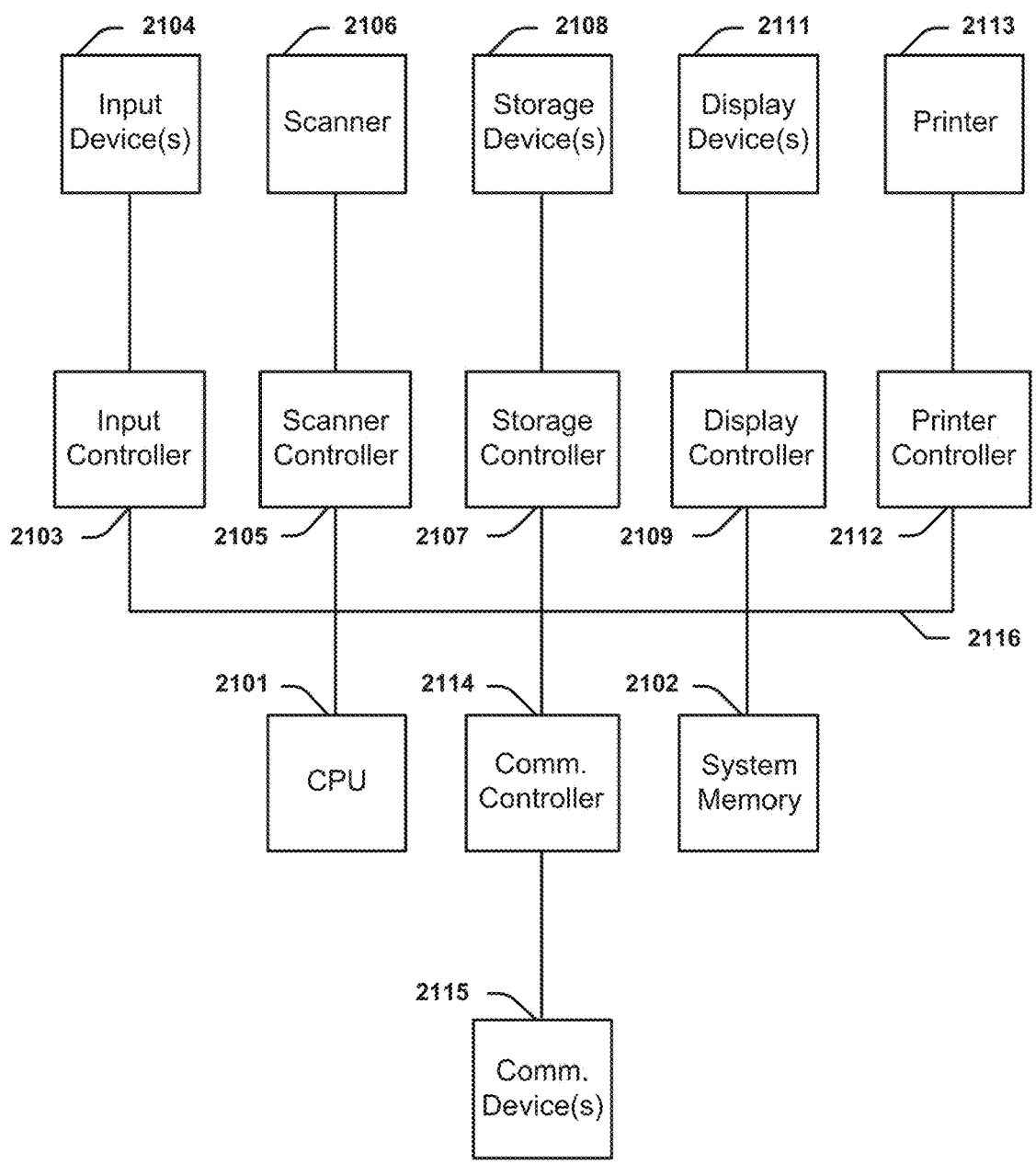
FIG. 21 depicts a simplified block diagram of a computing system to accelerate user interactions on touchscreen devices, according to various embodiments of the present disclosure.

FIG. 21 depicts a simplified block diagram of an information handling system to accelerate user interactions on touchscreen devices, according to various embodiments of the present disclosure. It will be understood that the functionalities shown for system 2100 may operate to support various embodiments of an information handling system—although it shall be understood that an information handling system may be differently configured and include different components. In embodiments, aspects of the present patent document may be directed to computing devices or systems. For purposes of this disclosure, a computing device may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as central processing unit (CPU) 2101 or hardware or software control logic, ROM, and/or other types of memory. CPU 2101 may be implemented with a microprocessor or the like, and may also include one or more graphics processing units (GPU) and/or a floating point coprocessor for mathematical computations. Additional components of the computing system may include one or more disk drives, one or more network ports for communicating with external devices as well as various input and output (I/O) devices 2104, such as a keyboard, a mouse, touchscreen and/or a video display. The computing system may also include one or more buses 2116 operable to transmit communications between the various hardware components.

Data and/or programs may be conveyed through any of a variety of tangible computer-readable media including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of embodiments may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the present document provide the functional information one skilled in the art would require to write program code (i.e., software) and/or to fabricate circuits (i.e., hardware) to perform the processing required.

It shall be noted that aspects of the embodiments may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of computer code include machine code, such as produced by a compiler, and files containing higher level code that are executed by a computer using an interpreter. Aspects of embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the examples and embodiments herein are exemplary and not limiting to the scope of the present invention. It is intended that all permutations, enhancements, equivalents, combinations, and improvements thereto that are apparent to those skilled in the art upon a reading of the current document are included within the true spirit and scope of the present invention.

We claim:

1. A method to improve interfacing with a configurable device, the method comprising:

via a document handler, launching a document viewer to spawn a document viewer window that displays a document;

via a session handler, launching a spliced network management (SNM) session to spawn a SNM session window to establish a back-end connection to a network device;

in response to a user selecting one or more items in both the document viewer window and the SNM session window, associating the document with the SNM session;

parsing the document by identifying commands to modify a configuration state of the network device;

in the document viewer, generating tags associated with the identified commands;

in response to the user selecting one of the tags, injecting the selected command into a command line of the SNM session window and executing the selected command that modifies the configuration state of the network device; and instructing the document handler to proceed to a following command.

2. The method according to claim 1, wherein identifying commands in the document further comprises selecting from a database of commands a list of commands that is compatible with the network device.

3. The method according to claim 1, wherein the selected command is a parameterized command that is injected into the network device via a command line of the SNM session.

4. The method according to claim 3, wherein selecting the command comprises modifying the command prior to injecting the command into the command line.

5. The method according to claim 1, wherein the spliced SNM session communicates an output from the network device to the SNM window.

6. The method according to claim 5, further comprising receiving and parsing the output to obtain a configuration state of the network device.

7. The method according to claim 1, further comprising controlling the document viewer and the spliced SNM session by an integrated hypermedia engine that monitors and manages interactions between at least the document window and the SNM window to enable auto-navigation within the document.

8. The method according to claim 1, further comprising, based on a feature dependence tree, grouping command sequences as features to maintain dependencies within the document.

9. An integrated hypermedia engine (IHE) to accelerate interactions using a touchscreen-enabled device, the IHE comprising:

one or more processors configured to execute a document handler comprising a document parser that parses the document by identifying commands to modify a configuration state of a network device to be displayed in a document viewer and associates tags with the identified commands, the one or more processor further configured to execute a session handler that hunches a spliced network management (SNM) session, the document viewer and the SNM session being built into and controlled by the IHE to monitor and manage interactions between a user, a document window, and a SNM window to enable auto-navigation within the document, the IHE configured to perform the steps of:

in response to the user selecting one or more items on a touchscreen-enabled device within the document window and the SNM session, creating an association between a document displayed in the document window and the SNM session, based on a type of the document;

generating the tags;

injecting the command front the document viewer into a command line of the SNM window and executing the selected command that modifies the configuration state of network device, in response to the user selecting a command by selecting a tag; and instructing the document handler to auto-navigate to another SNM command.

10. The IHE according to claim 9, wherein the document parser provides user-selectable parsing options to associate the tags with SNM commands based on a set of command categories.

11. The IHE according to claim 9, wherein the session handler accesses a parameterized command in a command buffer and presents in the SNM window options using an inline GUI panel.

12. The IHE according to claim 11, wherein the command line is presented with an input parameter for the parameterized command, the input parameter having been selected by the user via the inline GUI panel, and with a placeholder that when selected initiates a new SNM session.

13. The IHE according to claim 10, wherein at least one of the document handler and the session handler is launched as a child application in response to the user starting an ICLI application.

14. A system to accelerate command line interface interactions on touchscreen-enabled devices, the system comprising:

an integrated hypermedia engine (IHE) comprising a processor, a document handler and a session handler;

a network device coupled to the IHE via back-end connection, the document handler and the session handler respectively launch a document viewer and a spliced network management (SNM) session, the document handler comprising a document parser that identifies network device commands to modify a configuration state of a network device in the document viewer and associates tags with the network device commands, the IHE configured to perform the steps of:

in response to a user selecting one or more items on a touchscreen-enabled device within a document window and the SNM session, creating an association between a document displayed in the document window and the SNM session, based on a type of the document;

verifying that the document may be mapped to the network device;

generating the tags;

injecting the command from the document viewer into a command line of an SNM window and executing the selected command that modifies the configuration state of the network device, in response to the user selecting a command by selecting a tag; and instructing the document handler to auto-navigate to another SNM command.

15. The system according to claim 14, wherein the spliced SNM session communicates commands to the network device via the back-end connection and communicates an output from the network device to the SNM window.

16. The system according to claim 15, wherein the session handler further comprises a device parser that monitors a sequence of commands issued by a user and receives and parses the output to learn a configuration state of the network device and renders the configuration state to the SNM window.

17. The system according to claim 16, wherein the device parser groups a sequence of commands as a feature to maintain dependencies within the document based on a feature dependence tree.

18. The system according to claim 17, wherein the IHE detects a current feature being configured in the SNM window based on the sequence of commands and causes the document viewer to auto-navigate through the document to guide the user through subsequent feature configurations steps.

19. The system according to claim 16, further comprising an IHE-controlled console area that displays interactions between the user, the document, and the user-selected SNM session.

20. The system according to claim 18, wherein one or more interactions involve at least one of a voice recognition interface and a gesture-based input.

\* \* \* \* \*